United States Patent
Gaskell et al.

(10) Patent No.: US 11,333,072 B2
(45) Date of Patent: *May 17, 2022

(54) SHAFT BEARING POSITIONING IN A GAS TURBINE ENGINE

(71) Applicant: ROLLS-ROYCE plc, London (GB)

(72) Inventors: Jillian C Gaskell, Derby (GB); Chathura K Kannangara, Derby (GB); Punitha Kamesh, Derby (GB)

(73) Assignee: ROLLS-ROYCE plc, London (GB)

( * ) Notice: Subject to any disclaimer, the term of this patent is extended or adjusted under 35 U.S.C. 154(b) by 139 days.

This patent is subject to a terminal disclaimer.

(21) Appl. No.: 16/809,984

(22) Filed: Mar. 5, 2020

(65) Prior Publication Data
US 2021/0190008 A1    Jun. 24, 2021

(30) Foreign Application Priority Data

Dec. 19, 2019 (GB) .................................. 1918781

(51) Int. Cl.
    *F02C 7/06*    (2006.01)
    *F02K 3/04*    (2006.01)
    (Continued)

(52) U.S. Cl.
    CPC ............... *F02C 7/06* (2013.01); *F01D 25/16* (2013.01); *F02K 3/04* (2013.01); *F02C 7/36* (2013.01);
    (Continued)

(58) Field of Classification Search
    CPC .............................. F02C 7/06; F05D 2240/50
    See application file for complete search history.

(56) References Cited

U.S. PATENT DOCUMENTS

| 3,722,212 A | 3/1973 | Stein |
| 5,110,257 A | 5/1992 | Hibner et al. |
| (Continued) | | |

FOREIGN PATENT DOCUMENTS

| EP | 1396611 A2 | 3/2004 |
| EP | 1703085 A2 | 9/2006 |
| (Continued) | | |

OTHER PUBLICATIONS

Pera et al., "A Method to Estimate Weight and Dimensions of Aircraft Gas Turbine Engines," Final Report, vol. II: Users Manual, NASA-CR 135171, May 1977.
(Continued)

*Primary Examiner* — Juan G Flores
(74) *Attorney, Agent, or Firm* — Oliff PLC

(57) ABSTRACT

An aircraft gas turbine engine has an engine core with a turbine, compressor, and core shaft connecting the turbine to the compressor, a fan upstream of the engine core; and a gearbox. The engine core has three bearings, one forward, two rearward, to support the core shaft, a minor span being the axial distance between the two rearward bearings. A first blade to bearing ratio of the minor span divided by the product of the mass, radius at mid-height, and the square of the angular velocity at cruise for a blade of the lowest pressure set may have a value in the range from $2.0 \times 10^{-6}$ to $7.5 \times 10^{-6}$ $kg^{-1} \cdot rad^{-2} \cdot s^2$. A second blade to bearing ratio of the minor span divided by the product of mass and radius at mid-height for a blade of the lowest pressure set may have a value in the range from 0.8 to 6.0 $kg^{-1}$.

20 Claims, 8 Drawing Sheets

(51) Int. Cl.
F01D 25/16 (2006.01)
F02C 7/36 (2006.01)
(52) U.S. Cl.
CPC .... *F05D 2200/14* (2013.01); *F05D 2220/323* (2013.01); *F05D 2240/30* (2013.01); *F05D 2240/50* (2013.01)

(56) References Cited

U.S. PATENT DOCUMENTS

| | | | |
|---|---|---|---|
| 6,846,158 B2 | 1/2005 | Hull | |
| 8,702,377 B2 | 4/2014 | Cottrell et al. | |
| 9,476,320 B2* | 10/2016 | Savela | F02K 3/06 |
| 10,328,799 B2 | 6/2019 | Duong | |
| 10,392,970 B2* | 8/2019 | Ertas | F01D 15/12 |
| 10,738,646 B2* | 8/2020 | Sheridan | F02C 3/107 |
| 10,837,370 B1 | 11/2020 | Spruce | |
| 2003/0185685 A1 | 10/2003 | Simon | |
| 2006/0201160 A1 | 9/2006 | Richards | |
| 2007/0292274 A1 | 12/2007 | Burdgick et al. | |
| 2009/0031732 A1 | 2/2009 | Wilson, Jr. et al. | |
| 2009/0148271 A1 | 6/2009 | Alvanos et al. | |
| 2009/0269185 A1 | 10/2009 | Spencer et al. | |
| 2009/0304313 A1 | 12/2009 | Ertas | |
| 2010/0135770 A1 | 6/2010 | Durocher et al. | |
| 2011/0056208 A1 | 3/2011 | Norris et al. | |
| 2012/0124965 A1 | 5/2012 | Grabowski et al. | |
| 2013/0098059 A1 | 4/2013 | Suciu et al. | |
| 2013/0108202 A1 | 5/2013 | Do et al. | |
| 2013/0195647 A1* | 8/2013 | Muldoon | F02K 3/068 415/229 |
| 2013/0340435 A1* | 12/2013 | Savela | F01D 25/162 60/722 |
| 2014/0060083 A1 | 3/2014 | Savela | |
| 2015/0192070 A1 | 7/2015 | Kupratis et al. | |
| 2015/0247458 A1 | 9/2015 | Scott et al. | |
| 2015/0377123 A1 | 12/2015 | Adams et al. | |
| 2016/0195010 A1 | 7/2016 | Roberge | |
| 2016/0195019 A1 | 7/2016 | Roberge | |
| 2016/0348691 A1 | 12/2016 | Gallagher et al. | |
| 2017/0138202 A1 | 5/2017 | Wadia et al. | |
| 2017/0175675 A1 | 6/2017 | Sabnis | |
| 2017/0298773 A1 | 10/2017 | Ertas et al. | |
| 2018/0100435 A1 | 4/2018 | Moniz et al. | |
| 2018/0119574 A1 | 5/2018 | Ertas et al. | |
| 2018/0252166 A1 | 9/2018 | Pointon et al. | |
| 2018/0274443 A1* | 9/2018 | Pointon | F02K 3/06 |
| 2018/0334964 A1 | 11/2018 | Desjardins et al. | |
| 2019/0039454 A1 | 2/2019 | Duong | |
| 2019/0085716 A1 | 3/2019 | Pankaj et al. | |
| 2019/0153978 A1 | 5/2019 | Dievart et al. | |
| 2019/0309681 A1 | 10/2019 | Townes et al. | |
| 2021/0189908 A1* | 6/2021 | Gaskell | F01D 25/16 |
| 2021/0189956 A1* | 6/2021 | Kannangara | B64D 27/26 |
| 2021/0189962 A1* | 6/2021 | Gaskell | F01D 25/18 |

FOREIGN PATENT DOCUMENTS

| | | |
|---|---|---|
| EP | 3106685 A1 | 12/2016 |
| EP | 3379055 A1 | 9/2018 |
| WO | 2015/042553 A1 | 3/2015 |

OTHER PUBLICATIONS

Wendus et al., "Follow-On Technology Requirement Study for Advanced Subsonic Transport," NASA/CR-2003-212467, Aug. 2003.
Lolis, "Development of a Preliminary Weight Estimation Method for Advanced Turbofan Engines," Ph.D. Thesis, Cranfield University School of Engineering, Jul. 2014.
Onat et al., "A Method to Estimate Weight and Dimensions of Large and Small Gas Turbine Engines," NASA-CR-159481, Jan. 1979.
Waters et al., "Analysis of Turbofan Propuision System Weight and Dimensions," NASA Technical Memorandum, NASA TM X-73, 199, Jan. 1977.
Sheridan et al., "Geared Turbofan Engine: Driven by Innovation,"Encyclopedia of Aerospace Engineering, 2015.
Salamone, "Journal Bearing Design Types and Their Applications To Turbomachinery," Proceedings of the Thirteenth Turbomachinery Symposium, 179-190, 1984.
Wemming, "Validation and integration of a rubber engine model into an MDO environment," Master Thesis, Department of Management and Engineering, Linköping University, 2010.
Larsson et al., "Mission Optimization of the Geared Turbofan Engine," American Institute of Aeronautics and Astronautics, Inc., ISABE-2011-1314, pp. 1-7, 2011.
AirInsightGroup, "AirInsight Technical Analysis: The Core of the PW1000G Geared Turbo-Fan," airinsight.com, pp. 1-10, Oct. 2, 2012.
Devitt, "Damping and stiffness, a primer," Turbomachinery Magazine, www.turbomachinerymag.com, Oct. 12, 2017.
Gray et al. "Energy Efficient Engine Program Technology Benefit/ Cost Study, vol. II," NASA Contractor Report, NASA-CR-174766, pp. 1-118, Oct. 1, 1983.

* cited by examiner

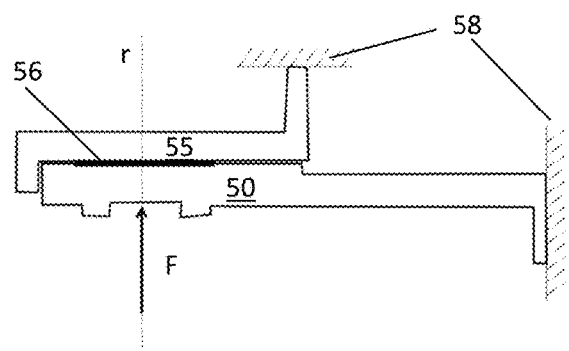 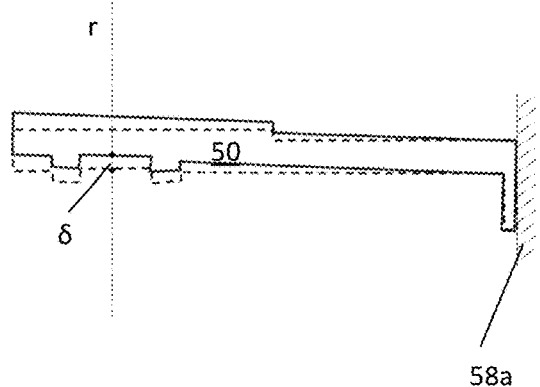
Fig.15A  Fig. 15B
Fig.16
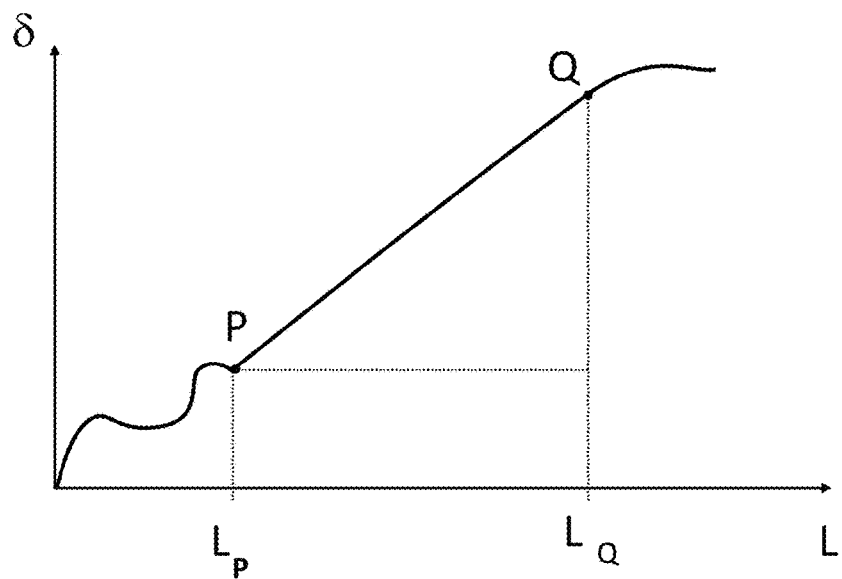
Fig.17

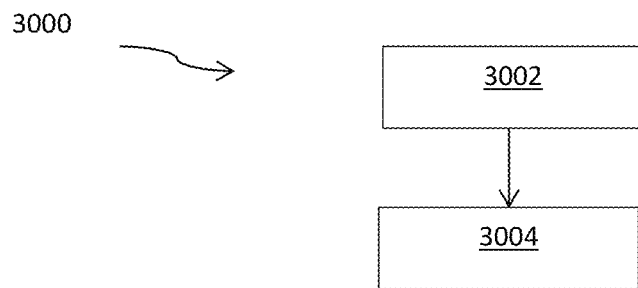
Fig.18
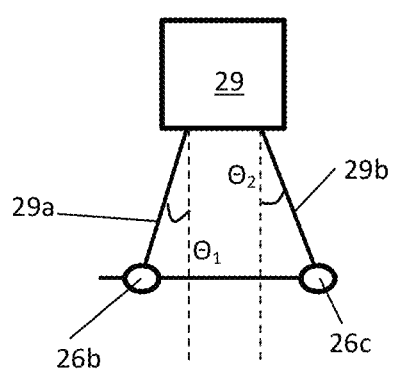 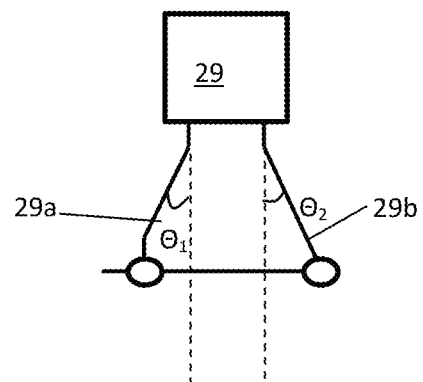
Fig.19 Fig. 20

SHAFT BEARING POSITIONING IN A GAS TURBINE ENGINE

The present disclosure relates to the mounting of a core shaft within a gas turbine engine for an aircraft, and in particular to bearing positioning and how such a shaft may be arranged and mounted so as to manage vibrational and resonance effects.

As used herein, a range "of value X to value Y", "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

According to a first aspect, there is provided a gas turbine engine for an aircraft comprising an engine core comprising a turbine, a compressor, and a core shaft connecting the turbine to the compressor, and wherein the compressor is the lowest pressure compressor of the engine and the turbine is the lowest pressure turbine of the engine and has a lowest pressure set of blades each blade of the lowest pressure set of blades having a mass, m, a radius at blade mid-height, r, and an angular velocity at cruise, $\omega$. The engine further comprises a fan located upstream of the engine core, the fan comprising a plurality of fan blades; and a gearbox that receives an input from the core shaft and outputs drive to the fan so as to drive the fan at a lower rotational speed than the core shaft.

The engine core further comprises three bearings arranged to support the core shaft, the three bearings comprising a forward bearing and two rearward bearings, with a minor span (S) being defined as the axial distance between the two rearward bearings. A first blade to bearing ratio of:

$$\frac{\text{the minor span }(S)}{mr\omega^2 \text{ (for a blade of the lowest pressure set)}}$$

has a value in the range from $2.0\times10^{-6}$ to $7.5\times10^{-6}$ $kg^{-1}\cdot rad^{-2}\cdot s^2$.

The inventor appreciated that the engine should not be linearly scaled up with a force increase ($mr\omega^2$ providing a measure of force), but rather that the minor span length (S) should be increased as little as possible so as to relatively reduce engine length and weight, so allowing the efficiency gains to be increased by avoiding the additional weight, and to avoid the development of unwanted whirl modes within the minor span. Whilst conventional wisdom suggests that a larger minor span is desirable to improve reaction of forces from the low pressure turbine, the inventor found that the risk of introducing whirl modes, and the introduction of more length and weight, counterbalanced the force reaction benefits and that the first blade to bearing ratio should therefore be maintained within the specified range.

The first blade to bearing ratio may be in the range from $3.0\times10^{-6}$ to $7.5\times10^{-6}$ $kg^{-1}\cdot rad^{-2}\cdot s^2$, optionally from $4.0\times 10^{-6}$ to $7.5\times10^{-6}$ $kg^{-1}\cdot rad^{-2}\cdot s^2$, optionally from $5.0\times10^{-6}$ to $7.5\times10^{-6}$ $kg^{-1}\cdot rad^{-2}\cdot s^2$, optionally from $2.0\times10^{-6}$ to $6.5\times 10^{-6}$ $kg^{-1}\cdot rad^{-2}\cdot s^2$, optionally from $3.0\times10^{-6}$ to $6.5\times10^{-6}$ $kg^{-1}\cdot rad^{-2}\cdot s^2$, optionally from $3.0\times10^{-6}$ to $4.5\times10^{-6}$ $kg^{-1}\cdot rad^{-2}\cdot s^2$, and further optionally from $4.5\times10^{-6}$ to $6.5\times 10^{-6}$ $kg^{-1}\cdot rad^{-2}\cdot s^2$.

A second blade to bearing ratio of:

$$\frac{\text{the minor span }(S)}{m\times r \text{ (for a blade of the lowest pressure set)}}$$

may have a value in the range from 0.8 to 6.0 $kg^{-1}$, optionally from 0.8 to 5.0 $kg^{-1}$, optionally from 0.8 to 4.0 $kg^{-1}$, optionally from 0.8 to 3.0 $kg^{-1}$, optionally from 0.8 to 2.0 $kg^{-1}$.

According to an second aspect, there is provided a gas turbine engine for an aircraft comprising an engine core comprising a turbine, a compressor, and a core shaft connecting the turbine to the compressor, and wherein the turbine is the lowest pressure turbine of the engine and has a lowest pressure set of blades, each blade of the lowest pressure set of blades having a mass, m, a radius at blade mid-height, r, and the compressor is the lowest pressure compressor of the engine. The engine further comprises a fan located upstream of the engine core, the fan comprising a plurality of fan blades; and a gearbox that receives an input from the core shaft and outputs drive to the fan so as to drive the fan at a lower rotational speed than the core shaft.

The engine core further comprises three bearings arranged to support the core shaft, the three bearings comprising a forward bearing and two rearward bearings, with a minor span (S) being defined as the axial distance between the two rearward bearings. A second blade to bearing ratio of:

$$\frac{\text{the minor span }(S)}{m\times r \text{ (for a blade of the lowest pressure set)}}$$

has a value in the range from 0.8 to 6.0 $kg^{-1}$.

The second blade to bearing ratio may be in the range from 0.8 to 5.0 $kg^{-1}$, optionally from 0.8 to 4.0 $kg^{-1}$, optionally from 0.8 to 3.0 $kg^{-1}$, optionally from 0.8 to 2.0 $kg^{-1}$.

Each blade of the lowest pressure set of blades has an angular velocity at cruise, $\omega$, and a first blade to bearing ratio of:

$$\frac{\text{the minor span }(S)}{mr\omega^2 \text{ (for a blade of the lowest pressure set 19c, 19d)}}$$

may have a value in the range from $2.0\times10^{-6}$ to $7.5\times10^{-6}$ $kg^{-1}\cdot rad^{-2}\cdot s^2$, optionally from $3.0\times10^{-6}$ to $7.5\times10^{-6}$ $kg^{-1}\cdot rad^{-2}\cdot s^2$, optionally from $4.0\times10^{-6}$ to $7.5\times10^{-6}$ $kg^{-1}\cdot rad^{-2}\cdot s^2$, optionally from $5.0\times10^{-6}$ to $7.5\times10^{-6}$ $kg^{-1}\cdot rad^{-2}\cdot s^2$, optionally from $2.0\times10^{-6}$ to $6.5\times10^{-6}$ $kg^{-1}\cdot rad^{-2}\cdot s^2$, optionally from $3.0\times10^{-6}$ to $6.5\times10^{-6}$ $kg^{-1}\cdot rad^{-2}\cdot s^2$, and further optionally from $4.5\times10^{-6}$ to $6.5\times 10^{-6}$ $kg^{-1}\cdot rad^{-2}\cdot s^2$.

In the first or second aspects, one or more of the following features may be present:

The minor span, S, may be in the range from 250 mm to 350 mm. In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The length of the core shaft (L) may be in the range from 1800 mm to 2900 mm, optionally from 2000 mm to 2900 mm, further optionally from 2300 mm to 2800 mm, and further optionally from 2400 mm to 2750 mm.

The value of blade mass, m, multiplied by blade radius at mid-height, r, may be in the range from 180 to 280 kg·mm The gearbox may have a gear ratio greater than 3, and optionally in the range from 3.1 to 3.8.

The core shaft may have a running speed in the range from 1500 rpm to 6200 rpm.

The running speed of the core shaft at cruise may be in the range of 5400-5700 rpm, and optionally of 5500-5600 rpm, at cruise.

The running speed of the core shaft under maximum take-off (MTO) conditions may be in the range of 5800-6200 rpm, and optionally of 5900-6100 rpm.

A length ratio (S/L) of the minor span between the two rearward bearings to the core shaft length may be equal to or less than 0.14, or equal to or less than 0.13, or equal to or less than 0.12. The length ratio S/L may be equal to or greater than 0.05, or equal to or greater than 0.06, or equal to or greater than 0.07, or equal to or greater than 0.08. For example, the length ratio S/L may be in the range from 0.05 to 0.14, optionally in the range from 0.05 to 0.13, optionally in the range from 0.06 to 0.13, and optionally in the range from 0.08 to 0.13.

The mass, m, of a blade of the lowest pressure set of blades may be in the range from 0.2 to 0.6 kg.

The radius, r, of a blade of the lowest pressure set of blades may be in the range from 400 to 600 mm.

Each blade of the lowest pressure set of blades may have an angular velocity at cruise, $\omega$ in the range from 560 to 600 rad·s$^{-1}$.

The length of the core shaft may be in the range from 1800 mm to 2900 mm or 2750 mm. The minor span may be in the range from 250 mm to 350 mm, and optionally from 260 mm to 350 mm.

The fan may have a fan diameter in the range from 330 cm to 380 cm.

The turbine has a turbine length defined between the leading edge of its most upstream blades and a trailing edge of its most downstream blades. A minor span to turbine length ratio of:

$$\frac{\text{minor span}}{\text{turbine length}}$$

may be equal to or less than 1.05, optionally equal to or less than 1.00, optionally equal to or less than 0.95. The minor span to turbine length ratio may be equal to or greater than 0.70, or equal to or greater than 0.75, or equal to or greater than 0.80, or equal to or greater than 0.85. For example the minor span to turbine length ratio may be in the range from 0.70 to 1.05, optionally from 0.70 to 1.00, optionally from 0.70 to 0.95, optionally from 0.80 to 1.05, optionally from 0.80 to 1.00, optionally from 0.80 to 0.95, optionally from 0.85 to 1.05, optionally from 0.85 to 1.00, and further optionally from 0.85 to 0.95.

The rearward bearings may be positioned axially level with or rearward of a leading edge of a lowest pressure turbine blade of the turbine at the root of the blade.

The rearward bearings may be positioned axially level with or rearward of a trailing edge of a turbine blade of a third set of turbine blades from the front of the turbine, at the root of the blade. In such embodiments, the turbine may comprise four sets of turbine blades, and optionally may have a total of four sets of turbine blades.

The forwardmost bearing of the rearward bearings may have a bearing stiffness in the range of 30 kN/mm to 100 kN/mm.

A stiffness ratio of the bearing stiffness at the forwardmost rearward bearing to the distance between the two rearward bearings may be in the range from 0.08 to 0.5 kN/mm$^2$, optionally in the range from 0.08 to 0.40 kN/mm$^2$, optionally in the range from 0.08 to 0.30 kN/mm$^2$, optionally in the range from 0.08 to 0.20 kN/mm$^2$, optionally in the range from 0.09 to 0.40 kN/mm$^2$, optionally in the range from 0.15 to 0.50 kN/mm$^2$, optionally in the range from 0.15 to 0.40 kN/mm$^2$, and further optionally in the range from 0.15 to 0.30 kN/mm$^2$.

According to a third aspect, there is provided a method of operation of a gas turbine engine for an aircraft, the engine comprising an engine core comprising a turbine, a compressor, and a core shaft connecting the turbine to the compressor, and wherein the compressor is the lowest pressure compressor of the engine and the turbine is the lowest pressure turbine of the engine and has a lowest pressure set of blades, each blade of the lowest pressure set of blades having a mass, m, a radius at blade mid-height, r, and an angular velocity at cruise, $\omega$. The engine core further comprises three bearings arranged to support the core shaft, the three bearings comprising a forward bearing and two rearward bearings, with a minor span (S) being defined as the axial distance between the two rearward bearings. The engine further comprises a fan located upstream of the engine core, the fan comprising a plurality of fan blades; and a gearbox arranged to receive an input from the core shaft and to output drive to the fan so as to drive the fan at a lower rotational speed than the core shaft.

The method comprises operating the engine such that a first blade to bearing ratio of:

$$\frac{\text{the minor span } (S)}{mr\omega^2 \text{ (for a blade of the lowest pressure set)}}$$

has a value in the range from $2.0\times10^{-6}$ to $7.5\times10^{-6}$ kg$^{-1}$·rad$^{-2}$·s$^2$ at cruise.

In various embodiments the method may comprise operating the engine such that the first blade to bearing ratio may be in the range from $3.0\times10^{-6}$ to $7.5\times10^{-6}$ kg$^{-1}$·rad$^{-2}$·s$^2$, optionally from $4.0\times10^{-6}$ to $7.5\times10^{-6}$ kg$^{-1}$·rad$^{-2}$·s$^2$, optionally from $5.0\times10^{-6}$ to $7.5\times10^{-6}$ kg$^{-1}$·rad$^{-2}$·s$^2$, optionally from $2.0\times10^{-6}$ to $6.5\times10^{-6}$ kg$^{-1}$·rad$^{-2}$·s$^2$, optionally from $3.0\times10^{-6}$ to $6.5\times10^{-6}$ kg$^{-1}$·rad$^{-2}$·s$^2$, and further optionally from $4.5\times10^{-6}$ to $6.5\times10^{-6}$ kg$^{-1}$·rad$^{-2}$·s$^2$.

The method may further comprise operating the core shaft at a running speed in the range from 1500 rpm to 6200 rpm, and optionally wherein the running speed of the core shaft may be one or more of:
  (i) in the range of 5400-5700 rpm, and optionally of 5500-5600 rpm, at cruise; and/or
  (ii) in the range of 5800-6200 rpm, and optionally of 5900-6100 rpm, under maximum take-off conditions.

The engine used to implement the method of the third aspect may be as described in the first and/or second aspect.

According to a fourth aspect, there is provided a gas turbine engine for an aircraft comprising an engine core comprising a turbine, a compressor, and a core shaft connecting the turbine to the compressor, and wherein the turbine is the lowest pressure turbine of the engine, the core shaft has a running speed in the range from 1500 rpm to 6200 rpm, and the compressor is the lowest pressure compressor of the engine. The engine further comprises a fan located upstream of the engine core, the fan comprising a plurality of fan blades; and a gearbox that receives an input from the core shaft and outputs drive to the fan so as to drive the fan at a lower rotational speed than the core shaft.

The engine core further comprises three bearings arranged to support the core shaft, the three bearings comprising a forward bearing and two rearward bearings, the core shaft having a length (L) between the forward bearing and the rearmost rearward bearing in the range from 1800 mm to 2900 mm or 2750 mm, and a minor span (S) between the two rearward bearings in the range from 250 mm to 350 mm.

As a result, there may be no primary resonance of the core shaft between the forward bearing and the forwardmost rearward bearings within the running speed range of the core shaft.

The length (L) and minor span (S) may be selected as appropriate for the desired running speed range to avoid such primary resonances.

In various embodiments the length of the core shaft (L) may be in the range from 2000 mm to 2900 mm, further optionally from 2300 mm to 2800 mm, and further optionally from 2400 mm to 2750 mm.

In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The inventor appreciated that the increased length of a core shaft when a gas turbine engine is scaled up may lead to a resonance frequency of the core shaft lying in or near the engine running range. Simply scaling up a known engine may therefore lead to increased risks of resonance-induced damage—the longer core shaft may be problematic. The inventor discovered that selecting the length, L, and minor span, S, as appropriate for a given running speed range may facilitate avoidance of deleterious whirl modes, and may reduce damage to the engine in use.

The lower bound of 1500 rpm on the core shaft running speed may be the minimum running speed under ground idle conditions and/or the upper bound of 6200 rpm on the core shaft running speed may be the upper bound on maximum take-off running speed.

According to a fifth aspect, there is provided a gas turbine engine for an aircraft comprising an engine core comprising a turbine, a compressor, and a core shaft connecting the turbine to the compressor, and wherein the turbine is the lowest pressure turbine of the engine, and the compressor is the lowest pressure compressor of the engine. The engine further comprises a fan located upstream of the engine core, the fan comprising a plurality of fan blades and having a fan diameter in the range from 330 cm to 380 cm; and a gearbox that receives an input from the core shaft and outputs drive to the fan so as to drive the fan at a lower rotational speed than the core shaft, the gearbox having a gear ratio in the range from 3.1 to 3.8.

The engine core further comprises three bearings arranged to support the core shaft, the three bearings comprising a forward bearing and two rearward bearings, the core shaft having a length between the forward bearing and the rearmost rearward bearing in the range from 1800 to 2900 mm or 2750 mm, and a minor span between the two rearward bearings in the range from 250 mm to 350 mm, such that there is no primary resonance of the core shaft within a running speed range of the core shaft.

The skilled person would appreciate that the fifth aspect shares an inventive concept with the fourth aspect, as the combination of fan diameter and gear ratio is linked to core shaft running speed. For a particular design of aircraft, a given combination of fan diameter and gear ratio may be used to infer an intended core shaft running speed range.

In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The core shaft running speed range may be from 1500 rpm to 6200 rpm.

In the fourth or fifth aspects, one or more of the following features may be present:

The turbine has a turbine length defined between the leading edge of its most upstream blades and a trailing edge of its most downstream blades. A minor span to turbine length ratio of:

$$\frac{\text{minor span}}{\text{turbine length}}$$

may be equal to or less than 1.05. The minor span to turbine length ratio may be equal to or less than 1.00, optionally equal to or less than 0.95. The minor span to turbine length ratio may be equal to or greater than 0.70, or equal to or greater than 0.75, or equal to or greater than 0.80, or equal to or greater than 0.85. For example the minor span to turbine length ratio may be in the range from 0.70 to 1.05, optionally from 0.70 to 1.00, optionally from 0.70 to 0.95, optionally from 0.80 to 1.05, optionally from 0.80 to 1.00, optionally from 0.80 to 0.95, optionally from 0.85 to 1.05, optionally from 0.85 to 1.00, and further optionally from 0.85 to 0.95 in the range from 0.85 to 0.95.

The turbine may comprise four sets of turbine blades. The two rearward bearings may both be located downstream of the trailing edge of a turbine blade of the third set of turbine blades from the front of the turbine, at the root of the blade. The turbine may comprise a total of four sets of turbine blades.

The two rearward bearings may be located downstream of the leading edge of the lowest pressure (most downstream) turbine blade of the turbine at the root of the blade.

The length of the core shaft (L) may be in the range from 1800 mm to 2900 mm, optionally from 2000 mm to 2900 mm, further optionally from 2300 mm to 2800 mm, and further optionally from 2400 mm to 2750 mm.

In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

A length ratio (S/L) of the minor span between the two rearward bearings to the core shaft length may be equal to or less than 0.14.

The length ratio may be equal to or less than 0.13, or equal to or less than 0.12. The length ratio may be equal to or greater than 0.05, or equal to or greater than 0.06, or equal to or greater than 0.07, or equal to or greater than 0.08. For example, the length ratio may be in the range from 0.05 to 0.14, optionally in the range from 0.05 to 0.13, optionally in the range from 0.06 to 0.13, and further optionally in the range from 0.08 to 0.13.

The forwardmost bearing of the rearward bearings may have a bearing stiffness in the range of 30 kN/mm to 100 kN/mm.

A stiffness ratio of the bearing stiffness at the forwardmost rearward bearing to the distance between the two rearward bearings may be in the range from 0.08 to 0.5 kN/mm², optionally in the range from 0.08 to 0.40 kN/mm², optionally in the range from 0.08 to 0.30 kN/mm², optionally in the range from 0.08 to 0.20 kN/mm², optionally in the range from 0.09 to 0.40 kN/mm², optionally in the range from 0.15 to 0.50 kN/mm², optionally in the range from 0.15 to 0.40 kN/mm², and further optionally in the range from 0.15 to 0.30 kN/mm².

The lowest pressure turbine of the engine has a lowest pressure set of blades, each blade of the lowest pressure set of blades having a mass, m, a radius at blade mid-height, r, and an angular velocity at cruise, ω.

A first blade to bearing ratio of:

$$\frac{\text{the minor span } (S)}{mr\omega^2 \text{ (for a blade of the lowest pressure set)}}$$

may have a value in the range from $2.0 \times 10^{-6}$ to $7.5 \times 10^{-6}$ kg⁻¹·rad⁻²·s², optionally from $3.0 \times 10^{-6}$ to $7.5 \times 10^{-6}$ kg⁻¹·rad⁻²·s², optionally from $4.0 \times 10^{-6}$ to $7.5 \times 10^{-6}$ kg⁻¹·rad⁻²·s², optionally from $5.0 \times 10^{-6}$ to $7.5 \times 10^{-6}$ kg⁻¹·rad⁻²·s², optionally from $2.0 \times 10^{-6}$ to $6.5 \times 10^{-6}$ kg⁻¹·rad⁻²·s², optionally from $3.0 \times 10^{-6}$ to $6.5 \times 10^{-6}$ kg⁻¹·rad⁻²·s², and further optionally from $4.5 \times 10^{-6}$ to $6.5 \times 10^{-6}$ kg⁻¹·rad⁻²·s².

A second blade to bearing ratio of:

$$\frac{\text{the minor span } (S)}{m \times r \text{ (for a blade of the lowest pressure set)}}$$

may have a value in the range from 0.8 to 6.0 kg⁻¹, optionally from 0.8 to 5.0 kg⁻¹, optionally from 0.8 to 4.0 kg⁻¹, optionally from 0.8 to 3.0 kg⁻¹, optionally from 0.8 to 2.0 kg⁻¹.

According to a sixth aspect, there is provided a method of operation of a gas turbine engine for an aircraft. The gas turbine engine comprises an engine core comprising a turbine, a compressor, and a core shaft connecting the turbine to the compressor, and wherein the turbine is the lowest pressure turbine of the engine. The engine core further comprises three bearings arranged to support the core shaft, the three bearings comprising a forward bearing and two rearward bearings, the core shaft having a length (L) between the forward bearing and the rearmost rearward bearing in the range from 1800 mm to 2900 mm, and a minor span (S) between the two rearward bearings in the range from 250 mm to 350 mm. The engine further comprises a fan located upstream of the engine core, the fan comprising a plurality of fan blades; and a gearbox arranged to receive an input from the core shaft and to output drive to the fan so as to drive the fan at a lower rotational speed than the core shaft The method comprises operating the engine such that the core shaft has a running speed in the range from 1500 rpm to 6200 rpm, and wherein there is no primary resonance of the core shaft within the running speed range of the core shaft.

The length of the core shaft (L) may be in the range from 1800 mm to 2750 mm, or from 2000 to 2750, or from 2400 mm to 2750 mm.

In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The engine used to implement the method may be as described in the fourth and/or fifth aspects.

According to a seventh aspect, there is provided a method of designing a gas turbine engine for an aircraft. The engine comprises an engine core comprising a turbine, a compressor, and a core shaft connecting the turbine to the compressor, and wherein the turbine is the lowest pressure turbine of the engine, the core shaft has a running speed in the range from 1500 rpm to 6200 rpm, and the compressor is the lowest pressure compressor of the engine. The engine further comprises a fan located upstream of the engine core, the fan comprising a plurality of fan blades; and a gearbox that receives an input from the core shaft and outputs drive to the fan so as to drive the fan at a lower rotational speed than the core shaft. The engine core further comprises three bearings arranged to support the core shaft, the three bearings comprising a forward bearing and two rearward bearings, the core shaft having a length (L) between the forward bearing and the rearmost rearward bearing in the range from 1800 mm to 2900 mm.

The method comprises:
  selecting positions for the forward bearing and the forwardmost bearing of the rearward bearings; and
  lengthening the core shaft rearward of the forwardmost bearing of the rearward bearings such that a minor span (S) defined between the two rearward bearings is in the range from 250 mm to 350 mm, and there is no primary resonance of the core shaft between the forward bearing and the forwardmost rearward bearing within the running speed range of the core shaft.

The length of the core shaft (L) may be in the range from 1800 mm to 2750 mm, or from 2000 to 2750, or from 2400 mm to 2750 mm.

In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The engine designed by the method of the seventh aspect may be the engine of the fourth and/or fifth aspect.

According to an eighth aspect, there is provided a gas turbine engine for an aircraft comprising an engine core comprising a turbine, a compressor, and a core shaft connecting the turbine to the compressor, and wherein the turbine is the lowest pressure turbine of the engine and the compressor is the lowest pressure compressor of the engine. The engine further comprises a fan located upstream of the engine core, the fan comprising a plurality of fan blades; and a gearbox that receives an input from the core shaft and outputs drive to the fan so as to drive the fan at a lower rotational speed than the core shaft. The engine core further comprises three bearings arranged to support the core shaft, the three bearings comprising a forward bearing and two rearward bearings, and wherein the forwardmost rearward bearing has a bearing stiffness in the range of 30 kN/mm to 100 kN/mm, the bearing stiffness being defined by the radial displacement caused by the application of a radial force at the axial centrepoint of the bearing.

The inventor appreciated that controlling the bearing stiffness to lie within the specified range may allow or facilitate management of vibrational modes, so potentially reducing damage to the engine in use caused by whirl mode displacements of the core shaft.

The core shaft has a length (L) between the forward bearing and the rearmost rearward bearing and a minor span (S) between the rearward bearings. The bearings may be arranged such that a length ratio (S/L) of the minor span to the core shaft length is equal to or less than 0.14, or equal to or less than 0.13, or equal to or less than 0.12. The length ratio may be equal to or greater than 0.05, or equal to or greater than 0.06, or equal to or greater than 0.07, or equal to or greater than 0.08. For example, the length ratio may be in the range from 0.05 to 0.14, optionally in the range from 0.05 to 0.13, optionally in the range from 0.06 to 0.13, and further optionally in the range from 0.08 to 0.13.

The core shaft may have a running speed range with a lower bound of 1500 rpm and an upper bound of 6200 rpm.

The bearing stiffness of the forwardmost rearward bearing may be equal to or around 50 kN/mm.

The gas turbine engine may further comprise a stationary supporting structure and a first bearing support structure. The forwardmost rearward bearing may be mounted to the stationary supporting structure by the first bearing support structure. The first bearing support structure may be attached to the stationary supporting structure at a first position located axially rearward of the forwardmost rearward bearing.

In such embodiments, the first bearing support structure may comprise a plurality of connecting members, which may be spaced circumferentially around the engine axis, connecting the bearing to the stationary support structure. The first bearing support structure may be described as a spring bar-type support structure.

The first bearing support structure may comprise an outer race of the forwardmost rearward bearing.

The gas turbine engine of embodiments with a first bearing support structure may further comprise a second bearing support structure. The second bearing support structure may be mounted to the stationary supporting structure, optionally at a second position located forward of, and at a larger radial distance from the engine axis than, the first position. The second bearing support structure may be connected to the first bearing support structure by a squeeze film damper in the region of the forwardmost rearward bearing.

A stiffness ratio of the bearing stiffness at the forwardmost rearward bearing to the minor span may be in the range from 0.08 to 0.5 kN/mm$^2$, optionally in the range from 0.08 to 0.40 kN/mm$^2$, optionally in the range from 0.08 to 0.30 kN/mm$^2$, optionally in the range from 0.08 to 0.20 kN/mm$^2$, optionally in the range from 0.09 to 0.40 kN/mm$^2$, optionally in the range from 0.15 to 0.50 kN/mm$^2$, optionally in the range from 0.15 to 0.40 kN/mm$^2$, and further optionally in the range from 0.15 to 0.30 kN/mm$^2$.

The length of the core shaft (L) may be in the range from 1800 mm to 2900 mm, optionally from 2000 mm to 2900 mm, further optionally from 2300 mm to 2800 mm, and further optionally from 2400 mm to 2750 mm.

In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The length of the core shaft may be in the range from 1800 mm to 2900 mm or 2750 mm. In such embodiments, the minor span may be in the range from 250 mm to 350 mm, optionally from 260 mm to 350 mm.

The fan may have a fan diameter in the range from 330 cm to 380 cm.

The length of the core shaft may be in the range from 1800 mm to 2900 mm or 2750 mm. The minor span may be in the range from 250 mm to 350 mm. The running speed of the core shaft may be in the range from 1500 rpm to 6200 rpm; and/or a diameter of the fan may be in the range from 330 cm to 380 cm and the gear ratio of the gearbox is in the range from 3.1 to 3.8. The length, minor span and/or running speed may be selected such that no primary resonance of the core shaft lies within the running range of the engine.

The rearward bearings may be positioned axially level with or rearward of a leading edge of a lowest pressure turbine blade of the turbine at the root of the blade.

The rearward bearings may be positioned axially level with or rearward of a trailing edge of a turbine blade of a third set of turbine blades from the front of the turbine, at the root of the blade, wherein the turbine comprises four sets of turbine blades.

The lowest pressure turbine of the engine has a lowest pressure set of blades, each blade of the lowest pressure set of blades having a mass, m, a radius at blade mid-height, r, and an angular velocity at cruise, ω.

A first blade to bearing ratio of:

$$\frac{\text{the minor span }(S)}{mr\omega^2 \text{ (for a blade of the lowest pressure set } 19c, 19d)}$$

may have a value in the range from $2.0 \times 10^{-6}$ to $7.5 \times 10^{-6}$ kg$^{-1}$·rad$^{-2}$·s$^2$, optionally from $3.0 \times 10^{-6}$ to $7.5 \times 10^{-6}$ kg$^{-1}$·rad$^{-2}$·s$^2$, optionally from $4.0 \times 10^{-6}$ to $7.5 \times 10^{-6}$ kg$^{-1}$·rad$^{-2}$·s$^2$, optionally from $5.0 \times 10^{-6}$ to $7.5 \times 10^{-6}$ kg$^{-1}$·rad$^{-2}$·s$^2$, optionally from $2.0 \times 10^{-6}$ to $6.5 \times 10^{-6}$ kg$^{-1}$·rad$^{-2}$·s$^2$, optionally from $3.0 \times 10^{-6}$ to $6.5 \times 10^{-6}$ kg$^{-1}$·rad$^{-2}$·s$^2$, and further optionally from $4.5 \times 10^{-6}$ to $6.5 \times 10^{-6}$ kg$^{-1}$·rad$^{-2}$·s$^2$.

A second blade to bearing ratio of:

$$\frac{\text{the minor span }(S)}{m \times r \text{ (for a blade of the lowest pressure set } 19c, 19d)}$$

may have a value in the range from 0.8 to 6.0 kg$^{-1}$, optionally from 0.8 to 5.0 kg$^{-1}$, optionally from 0.8 to 4.0 kg$^{-1}$, optionally from 0.8 to 3.0 kg$^{-1}$, optionally from 0.8 to 2.0 kg$^{-1}$.

The turbine has a length between the leading edge of the forwardmost turbine blade of the turbine and a trailing edge of the rearmost turbine blade of the turbine. A minor span to turbine length ratio may be equal to or less than 1.05. The minor span to turbine length ratio may be equal to or less than 1.00, optionally equal to or less than 0.95. The minor span to turbine length ratio may be equal to or greater than 0.70, or equal to or greater than 0.75, or equal to or greater than 0.80, or equal to or greater than 0.85. For example the minor span to turbine length ratio may be in the range from 0.70 to 1.05, optionally from 0.70 to 1.00, optionally from 0.70 to 0.95, optionally from 0.80 to 1.05, optionally from 0.80 to 1.00, optionally from 0.80 to 0.95, optionally from 0.85 to 1.05, optionally from 0.85 to 1.00, and further optionally from 0.85 to 0.95 in the range from 0.85 to 0.95.

According to a ninth aspect, there is provided a gas turbine engine for an aircraft comprising an engine core comprising a turbine, a compressor, and a core shaft connecting the turbine to the compressor, and wherein the turbine is the lowest pressure turbine of the engine and the compressor is the lowest pressure compressor of the engine. The turbine has a turbine length defined as the distance between the root of the most upstream blade of the turbine at its leading edge and the root of the most downstream blade of the turbine at its trailing edge. The engine further comprises a fan located upstream of the engine core, the fan comprising a plurality of fan blades; and a gearbox that receives an input from the core shaft and outputs drive to the fan so as to drive the fan at a lower rotational speed than the core shaft.

The engine core further comprises three bearings arranged to support the core shaft, the three bearings comprising a forward bearing and two rearward bearings, with a minor span (S) defined as the distance between the two rearward bearings. A minor span to turbine length ratio of:

$$\frac{\text{minor span}}{\text{turbine length}}$$

is equal to or less than 1.05.

The inventor appreciated that keeping the minor span to turbine length ratio within this range, and more generally smaller than that in known aircraft, may help to reduce or avoid deleterious whirl modes in operation.

The minor span to turbine length ratio may be equal to or less than 1.00, optionally equal to or less than 0.95. The minor span to turbine length ratio may be equal to or greater than 0.70, or equal to or greater than 0.75, or equal to or greater than 0.80, or equal to or greater than 0.85. For example the minor span to turbine length ratio may be in the range from 0.70 to 1.05, optionally from 0.70 to 1.00, optionally from 0.70 to 0.95, optionally from 0.80 to 1.05, optionally from 0.80 to 1.00, optionally from 0.80 to 0.95, optionally from 0.85 to 1.05, optionally from 0.85 to 1.00, and further optionally from 0.85 to 0.95 in the range from 0.85 to 0.95.

The inventor appreciated that the increased length of a core shaft when a gas turbine engine is scaled up may lead to a resonance frequency of the core shaft lying in or near the engine running range. Simply scaling up a known engine may therefore lead to increased risks of resonance-induced damage—the longer core shaft may be problematic. The inventor discovered that arranging the minor span to be approximately equal to, and optionally slightly smaller than, the turbine length (of the lowest pressure turbine, in embodiments with more than one turbine), and more specifically within the claimed range, may facilitate avoidance of deleterious whirl modes, and may reduce damage to the engine in use.

The turbine may comprise a total of four sets of turbine blades. In such embodiments, both of the two rearward bearings may be located downstream of the trailing edge of a turbine blade of the third set of turbine blades from the front of the turbine, at the root of the blade.

The two rearward bearings may be located downstream of the leading edge of the lowest pressure (most downstream) turbine blade of the turbine at the root of the blade.

The length of the core shaft (L) may be in the range from 1800 mm to 2900 mm, optionally from 2000 mm to 2900 mm, further optionally from 2300 mm to 2800 mm, and further optionally from 2400 mm to 2750 mm.

In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The core shaft may have a running speed range with a lower bound of 1500 rpm and an upper bound of 6200 rpm. The upper bound on the core shaft running speed range may be the upper bound on maximum take-off (MTO) running speed. The lower bound on the running speed of the core shaft may be the minimum running speed under ground idle conditions.

The core shaft has a length, L, between the forwardmost bearing and the rearmost bearing and a distance (the minor span, S) between the two rearward bearings. The bearings may be arranged such that a length ratio (S/L) of the distance between the two rearward bearings to the core shaft length is equal to or less than 0.14, or equal to or less than 0.13, or equal to or less than 0.12. The length ratio, S/L, of the distance between the two rearward bearings (S) to the core shaft length (L) may be equal to or greater than 0.05, or equal to or greater than 0.06, or equal to or greater than 0.07, or equal to or greater than 0.08. For example, the length ratio, S/L, of the distance between the two rearward bearings (S) to the core shaft length (L) may be in the range from 0.05 to 0.14, optionally in the range from 0.05 to 0.13, optionally in the range from 0.06 to 0.13, and optionally in the range from 0.08 to 0.13.

The forwardmost bearing of the rearward bearings may have a bearing stiffness in the range of 30 kN/mm to 100 kN/mm. A stiffness ratio of the bearing stiffness at the forwardmost rearward bearing divided by the distance between the two rearward bearings may be in the range from 0.08 to 0.5 kN/mm$^2$, optionally in the range from 0.08 to 0.40 kN/mm$^2$, optionally in the range from 0.08 to 0.30 kN/mm$^2$, optionally in the range from 0.08 to 0.20 kN/mm$^2$, optionally in the range from 0.09 to 0.40 kN/mm$^2$, optionally in the range from 0.15 to 0.50 kN/mm$^2$, optionally in the range from 0.15 to 0.40 kN/mm$^2$, and further optionally in the range from 0.15 to 0.30 kN/mm$^2$.

The length (L) of the core shaft may be in the range from 1800 mm to 2900 mm or 2750 mm. The distance (S) between the two rearward bearings may be in the range from 250 mm to 350 mm, optionally from 260 mm to 350 mm.

The fan may have a fan diameter in the range from 330 cm to 380 cm.

The gas length of the core shaft may be in the range from 1800 mm to 2900 mm or 2750 mm; and the minor span may be in the range from 250 mm to 350 mm, optionally from 260 mm to 350 mm. The running speed of the core shaft may be in the range from 1500 rpm to 6200 rpm; and/or a diameter of the fan may be in the range from 330 cm to 380 cm and the gear ratio of the gearbox may be in the range from 3.1 to 3.8. The length, minor span and/or running speed may be selected such that no primary resonance of the core shaft lies within the running range of the engine.

The lowest pressure turbine of the engine has a lowest pressure set of blades, each blade of the lowest pressure set of blades having a mass, m, a radius at blade mid-height, r, and an angular velocity at cruise, ω.

A first blade to bearing ratio of:

$$\frac{\text{the minor span }(S)}{mr\omega^2 \text{ (for a blade of the lowest pressure set)}}$$

may have a value in the range from $2.0 \times 10^{-6}$ to $7.5 \times 10^{-6}$ kg$^{-1}$·rad$^{-2}$·s$^2$, optionally from $3.0 \times 10^{-6}$ to $7.5 \times 10^{-6}$ $kg^{-1} \cdot rad^{-2} \cdot s^2$, optionally from $4.0 \times 10^{-6}$ to $7.5 \times 10^{-6}$ $kg^{-1} \cdot rad^{-2} \cdot s^2$, optionally from $5.0 \times 10^{-6}$ to $7.5 \times 10^{-6}$ $kg^{-1} \cdot rad^{-2} \cdot s^2$, optionally from $2.0 \times 10^{-6}$ to $6.5 \times 10^{-6}$ $kg^{-1} \cdot rad^{-2} \cdot s^2$, optionally from $3.0 \times 10^{-6}$ to $6.5 \times 10^{-6}$ $kg^{-1} \cdot rad^{-2} \cdot s^2$, and further optionally from $4.5 \times 10^{-6}$ to $6.5 \times 10^{-6}$ $kg^{-1} \cdot rad^{-2} \cdot s^2$.

A second blade to bearing ratio of:

$$\frac{\text{the minor span } (S)}{m \times r \text{ (for a blade of the lowest pressure set)}}$$

may have a value in the range from 0.8 to 6.0 $kg^{-1}$, optionally from 0.8 to 5.0 $kg^{-1}$, optionally from 0.8 to 4.0 $kg^{-1}$, optionally from 0.8 to 3.0 $kg^{-1}$, optionally from 0.8 to 2.0 $kg^{-1}$.

According to a tenth aspect there is provided a gas turbine engine for an aircraft comprising an engine core comprising a turbine, a compressor, and a core shaft connecting the turbine to the compressor, and wherein the turbine is the lowest pressure turbine of the engine, and comprises turbine blades, and the compressor is the lowest pressure compressor of the engine. The engine additionally comprises a fan located upstream of the engine core, the fan comprising a plurality of fan blades; and a gearbox that receives an input from the core shaft and outputs drive to the fan so as to drive the fan at a lower rotational speed than the core shaft. The engine core further comprises three bearings arranged to support the core shaft, the three bearings comprising two rearward bearings located downstream of the leading edge of the lowest pressure turbine blades of the turbine at the root of the blades. The two rearward bearings may therefore be described as being located downstream of the leading edge of the last/rearmost turbine blade.

The inventor appreciated that the core shaft generally moves least (in the radial direction), and is most level (parallel to the engine axis) at the axial position of the bearings—whilst whirl modes and other bends or displacements may occur between bearings, the bearings serve to limit radial shaft movement. The inventor appreciated that careful control of shaft length and bearing position may therefore allow whirl modes of the engine to be managed, so reducing the risk of damage to the engine.

The inventor additionally discovered that positioning the bearings nearer the bigger and larger turbine stages, towards the rear of the turbine, provides improved turbine support as shaft movements relative to the turbine position may have more of a deleterious effect on these larger turbine stages.

The gas turbine engine may further comprise a disc arranged to support the lowest pressure turbine blades of the turbine. The two rearward bearings may be located downstream of a centreline of the disc.

The length of the core shaft may be in the range from 1800 to 2900 mm, optionally in the range from 2000 to 2900 mm, optionally in the range from 2300 to 2800 mm, and further optionally in the range from 2400 to 2750 mm.

The core shaft may have a running speed range with a lower bound of 1500 rpm and an upper bound of 6200 rpm.

The upper bound on the core shaft running speed range may be the upper bound on maximum take-off (MTO) running speed. The lower bound on the running speed of the core shaft may be the minimum running speed under ground idle conditions.

The core shaft has a length, L, between the forwardmost bearing and the rearmost bearing, and a distance, S, between the two rearward bearings. The bearings may be arranged such that a length ratio, S/L, of the distance between the two rearward bearings (S) to the core shaft length (L) may be equal to or less than 0.14, or equal to or less than 0.13, or equal to or less than 0.12. The length ratio, S/L, of the distance between the two rearward bearings (S) to the core shaft length (L) may be equal to or greater than 0.05, or equal to or greater than 0.06, or equal to or greater than 0.07, or equal to or greater than 0.08. For example, the length ratio, S/L, of the distance between the two rearward bearings (S) to the core shaft length (L) may be in the range from 0.05 to 0.14, optionally in the range from 0.05 to 0.13, optionally in the range from 0.06 to 0.13, and optionally in the range from 0.08 to 0.13.

The length (L) of the core shaft may be in the range from 1800 mm to 2900 mm or 2750 mm. In such embodiments, the distance between the two rearward bearings (S) may be in the range from 250 mm to 350 mm, or optionally from 260 mm and 350 mm.

According to an eleventh aspect, there is provided a gas turbine engine for an aircraft comprising an engine core comprising a turbine, a compressor, and a core shaft connecting the turbine to the compressor, and wherein the turbine is the lowest pressure turbine of the engine, and comprises four sets of turbine blades, and the compressor is the lowest pressure compressor of the engine. The engine further comprises a fan located upstream of the engine core, the fan comprising a plurality of fan blades; and a gearbox that receives an input from the core shaft and outputs drive to the fan so as to drive the fan at a lower rotational speed than the core shaft. The engine core further comprises three bearings arranged to support the core shaft, the three bearings comprising two rearward bearings located downstream of the trailing edge of a turbine blade of the third set of turbine blades from the front of the turbine, at the root of the blade.

One or more of the following features may apply for a gas turbine engine of the tenth and/or eleventh aspect:

The forwardmost bearing of the rearward bearings may have a bearing stiffness in the range of 30 kN/mm to 100 kN/mm.

A stiffness ratio of the stiffness at the forwardmost rearward bearing to the distance between the two rearward bearings (S) may be in the range from 0.08 to 0.5 $kN/mm^2$, optionally in the range from 0.08 to 0.40 $kN/mm^2$, optionally in the range from 0.08 to 0.30 $kN/mm^2$, optionally in the range from 0.08 to 0.20 $kN/mm^2$, optionally in the range from 0.09 to 0.40 $kN/mm^2$, optionally in the range from 0.15 to 0.50 $kN/mm^2$, optionally in the range from 0.15 to 0.40 $kN/mm^2$, and further optionally in the range from 0.15 to 0.30 $kN/mm^2$.

The length (L) of the core shaft may be in the range from 1800 mm to 2900 mm or 2750 mm. In such embodiments, the distance between the two rearward bearings (S) may be in the range from 250 mm to 350 mm, or optionally from 260 mm and 350 mm.

The fan may have a fan diameter in the range from 330 cm to 380 cm.

The length of the core shaft (L) may be in the range from 1800 mm to 2900 mm, optionally from 2000 mm to 2900 mm, further optionally from 2300 mm to 2800 mm, and further optionally from 2400 mm to 2750 mm.

The distance between the two rearward bearings (S), which may be referred to as the minor span, may be in the range from 250 mm to 350 mm. In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The running speed of the core shaft may be in the range from 1500 rpm to 6200 rpm. Additionally or alternatively, the diameter of the fan may be in the range from 330 cm to 380 cm. The gear ratio of the gearbox may be in the range from 3.1 to 3.8.

The length, minor span and/or running speed may be selected such that no primary resonance of the core shaft lies within the running range of the engine.

The lowest pressure turbine of the engine has a lowest pressure set of blades. Each blade of the lowest pressure set of blades has a mass, m, a radius at blade mid-height, r, and an angular velocity at cruise, $\omega$. A minor span (S) is defined, as mentioned above, as the axial distance between the two rearward bearings.

A first blade to bearing ratio of:

$$\frac{\text{the minor span } (S)}{mr\omega^2 \text{ (for a blade of the lowest pressure set)}}$$

may have a value in the range from $2.0\times10^{-6}$ to $7.5\times10^{-6}$ kg$^{-1}$·rad$^{-2}$·s$^2$, optionally from $3.0\times10^{-6}$ to $7.5\times10^{-6}$ kg$^{-1}$·rad$^{-2}$·s$^2$, optionally from $4.0\times10^{-6}$ to $7.5\times10^{-6}$ kg$^{-1}$·rad$^{-2}$·s$^2$, optionally from $5.0\times10^{-6}$ to $7.5\times10^{-6}$ kg$^{-1}$·rad$^{-2}$·s$^2$, optionally from $2.0\times10^{-6}$ to $6.5\times10^{-6}$ kg$^{-1}$·rad$^{-2}$·s$^2$, optionally from $3.0\times10^{-6}$ to $6.5\times10^{-6}$ kg$^{-1}$·rad$^{-2}$·s$^2$, and further optionally from $4.5\times10^{-6}$ to $6.5\times10^{-6}$ kg$^{-1}$·rad$^{-2}$·s$^2$.

Additionally or alternatively, a second blade to bearing ratio of:

$$\frac{\text{the minor span } (S)}{m \times r \text{ (for a blade of the lowest pressure set)}}$$

may have a value in the range from 0.8 to 6.0 kg$^{-1}$, optionally from 0.8 to 5.0 kg$^{-1}$, optionally from 0.8 to 4.0 kg$^{-1}$, optionally from 0.8 to 3.0 kg$^{-1}$, optionally from 0.8 to 2.0 kg$^{-1}$.

The turbine has a length between the leading edge of the forwardmost turbine blade of the turbine and a trailing edge of the rearmost turbine blade of the turbine. A minor span to turbine length ratio (i.e. S divided by the turbine length) may be equal to or less than 1.05, optionally equal to or less than 1.00, optionally equal to or less than 0.95. The minor span to turbine length ratio may be equal to or greater than 0.70, or equal to or greater than 0.75, or equal to or greater than 0.80, or equal to or greater than 0.85. For example the minor span to turbine length ratio may be in the range from 0.70 to 1.05, optionally from 0.70 to 1.00, optionally from 0.70 to 0.95, optionally from 0.80 to 1.05, optionally from 0.80 to 1.00, optionally from 0.80 to 0.95, optionally from 0.85 to 1.05, optionally from 0.85 to 1.00, and further optionally from 0.85 to 0.95.

The turbine may comprise a total of four sets of turbine blades. In an alternative embodiment, the turbine may comprise a total of three sets of turbine blades.

According to a twelfth aspect, there is provided a gas turbine engine for an aircraft comprising an engine core comprising a turbine, a compressor, and a core shaft connecting the turbine to the compressor. The turbine is the lowest pressure turbine of the engine and the compressor is the lowest pressure compressor of the engine. The core shaft has a running speed range with a lower bound of 1500 rpm and an upper bound of 6200 rpm. The engine further comprises a fan located upstream of the engine core, the fan comprising a plurality of fan blades; and a gearbox that receives an input from the core shaft and outputs drive to the fan so as to drive the fan at a lower rotational speed than the core shaft.

The engine core further comprises three bearings arranged to support the core shaft, the three bearings comprising a forward bearing and two rearward bearings. The core shaft has a length (L) between the forward bearing and the rearmost rearward bearing, and a minor span (S) between the rearward bearings. The bearings are arranged such that a length ratio of the minor span to the core shaft length (S/L) is equal to or less than 0.14.

The length ratio may be equal to or less than 0.13, or equal to or less than 0.12. The length ratio may be equal to or greater than 0.05, or equal to or greater than 0.06, or equal to or greater than 0.07, or equal to or greater than 0.08. For example, the length ratio may be in the range from 0.05 to 0.14, optionally in the range from 0.05 to 0.13, optionally in the range from 0.06 to 0.13, and further optionally in the range from 0.08 to 0.13.

The inventor appreciated that the increased length of a core shaft when a gas turbine engine is scaled up may lead to a resonance frequency of the core shaft lying in or near the engine running range. Simply scaling up a known engine may therefore lead to increased risks of resonance-induced damage—the longer core shaft may be problematic.

However, making the core shaft still longer—extending rearward of a first rearward bearing and to a second rearward bearing, with the spacing between the first and second rearward bearings being within a set range with respect to the total core shaft length—was found to increase stiffness of the core shaft and to move the resonant frequency away from the engine running range in some embodiments.

The upper bound on the core shaft running speed range may be the upper bound on maximum take-off running speed.

The lower bound on the core shaft running speed may be the minimum running speed under ground idle conditions.

The running speed of the core shaft under cruise conditions may be in the range from 5400 to 5700 rpm, and optionally in the range from 5500 to 5600 rpm.

The running speed of the core shaft under maximum take-off (MTO) conditions may be in the range from 5800 to 6200 rpm, and optionally in the range from 5900 to 6100 rpm.

The length of the core shaft (L) may be in the range from 1800 mm to 2900 mm, optionally from 2000 mm to 2900 mm, further optionally from 2300 mm to 2800 mm, and further optionally from 2400 mm to 2750 mm.

In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm.

The forwardmost bearing of the rearward bearings may have a bearing stiffness in the range of 30 kN/mm to 100 kN/mm. A stiffness ratio of the stiffness at the forwardmost rearward bearing to the minor span may be in the range from 0.08 to 0.5 kN/mm$^2$, optionally in the range from 0.08 to 0.40 kN/mm$^2$, optionally in the range from 0.08 to 0.30 kN/mm$^2$, optionally in the range from 0.08 to 0.20 kN/mm$^2$, optionally in the range from 0.09 to 0.40 kN/mm$^2$, optionally in the range from 0.15 to 0.50 kN/mm$^2$, optionally in the range from 0.15 to 0.40 kN/mm$^2$, and further optionally in the range from 0.15 to 0.30 kN/mm$^2$.

The length (L) of the core shaft may be in the range from 1800 mm to 2900 mm or 2750 mm. The minor span (S) may be in the range from 250 mm to 350 mm, optionally from 260 mm to 350 mm.

The fan may have a fan diameter in the range from 330 cm to 380 cm.

In some embodiments, the length of the core shaft may be in the range from 1800 mm to 2900 mm or 2750 mm. The minor span may be in the range from 250 mm to 350 mm, optionally from 260 mm to 350 mm. The running speed of the core shaft may be in the range from 1500 rpm to 6200 rpm; and/or a diameter of the fan may be in the range from 330 cm to 380 cm and the gear ratio of the gearbox may be in the range from 3.1 to 3.8. In such embodiments, the length, minor span and/or running speed may be selected such that no primary resonance of the core shaft (lies within the running range of the engine.

The rearward bearings may be positioned axially level with or rearward of:
  (i) a leading edge of a lowest pressure turbine blade of the turbine at the root of the blade; and/or
  (ii) a trailing edge of a turbine blade of a third set of turbine blades from the front of the turbine, at the root of the blade, wherein the turbine comprises four sets of turbine blades.

The inventor appreciated that positioning the rearward bearings nearer the bigger and larger turbine stages, towards the rear of the turbine, provides improved turbine support as shaft movements relative to the turbine position may have more of a deleterious effect on these larger turbine stages.

The lowest pressure turbine of the engine has a lowest pressure set of blades, each blade of the lowest pressure set of blades having a mass, m, a radius at blade mid-height, r, and an angular velocity at cruise, ω. A minor span (S) is defined as the axial distance between the two rearward bearings, as stated above.

A first blade to bearing ratio of:

$$\frac{\text{the minor span }(S)}{mr\omega^2 \text{ (for a blade of the lowest pressure set)}}$$

may have a value in the range from $2.0 \times 10^{-6}$ to $7.5 \times 10^{-6}$ kg$^{-1}$·rad$^{-2}$·s$^2$, optionally from $3.0 \times 10^{-6}$ to $7.5 \times 10^{-6}$ kg$^{-1}$·rad$^{-2}$·s$^2$, optionally from $4.0 \times 10^{-6}$ to $7.5 \times 10^{-6}$ kg$^{-1}$·rad$^{-2}$·s$^2$, optionally from $5.0 \times 10^{-6}$ to $7.5 \times 10^{-6}$ kg$^{-1}$·rad$^{-2}$·s$^2$, optionally from $2.0 \times 10^{-6}$ to $6.5 \times 10^{-6}$ kg$^{-1}$·rad$^{-2}$·s$^2$, optionally from $3.0 \times 10^{-6}$ to $6.5 \times 10^{-6}$ kg$^{-1}$·rad$^{-2}$·s$^2$, and further optionally from $4.5 \times 10^{-6}$ to $6.5 \times 10^{-6}$ kg$^{-1}$·rad$^{-2}$·s$^2$.

Additionally or alternatively, a second blade to bearing ratio of:

$$\frac{\text{the minor span }(S)}{m \times r \text{ (for a blade of the lowest pressure set)}}$$

may have a value in the range from 0.8 to 6.0 kg$^{-1}$, optionally from 0.8 to 5.0 kg$^{-1}$, optionally from 0.8 to 4.0 kg$^{-1}$, optionally from 0.8 to 3.0 kg$^{-1}$, optionally from 0.8 to 2.0 kg$^{-1}$.

The turbine has a length between the leading edge of the forwardmost turbine blade of the turbine and a trailing edge of the rearmost turbine blade of the turbine. A minor span to turbine length ratio may be in the range from 0.70 to 1.05, optionally from 0.70 to 1.00, optionally from 0.70 to 0.95, optionally from 0.80 to 1.05, optionally from 0.80 to 1.00, optionally from 0.80 to 0.95, optionally from 0.85 to 1.05, optionally from 0.85 to 1.00, and further optionally from 0.85 to 0.95.

According to a thirteenth aspect, there is provided a gas turbine engine for an aircraft comprising an engine core comprising a turbine, a compressor, and a core shaft connecting the turbine to the compressor, and wherein the turbine is the lowest pressure turbine of the engine and the compressor is the lowest pressure compressor of the engine. The engine further comprises a fan located upstream of the engine core, the fan comprising a plurality of fan blades; and a gearbox that receives an input from the core shaft and outputs drive to the fan so as to drive the fan at a lower rotational speed than the core shaft.

The engine core further comprises three bearings arranged to support the core shaft, the three bearings comprising a forward bearing and two rearward bearings, the distance between the two rearward bearings being defined as the minor span, S. The forwardmost rearward bearing has a bearing stiffness defined by the radial displacement caused by the application of a radial force at the axial centrepoint of the bearing. A stiffness ratio of the bearing stiffness at the forwardmost rearward bearing to the minor span is in the range from 0.08 to 0.5 kN/mm$^2$.

The bearing stiffness ratio may be in the range from 0.09 to 0.40 kN/mm$^2$, optionally in the range from 0.08 to 0.30 kN/mm$^2$, optionally in the range from 0.08 to 0.20 kN/mm$^2$, optionally in the range from 0.09 to 0.40 kN/mm$^2$, optionally in the range from 0.15 to 0.50 kN/mm$^2$, optionally in the range from 0.15 to 0.40 kN/mm$^2$, and further optionally in the range from 0.15 to 0.30 kN/mm$^2$.

The inventor appreciated that controlling the bearing stiffness and minor span such that the ratio of the two lies within the specified range may allow or facilitate management of vibrational modes, so potentially reducing damage to the engine in use caused by whirl mode displacements of the core shaft.

The core shaft has a length, L, between the forward bearing and the rearmost rearward bearing. The bearings may be arranged such that a length ratio (S/L) of the minor span to the core shaft length is equal to or less than 0.14, or equal to or less than 0.13, or equal to or less than 0.12. The length ratio S/L may be equal to or greater than 0.05, or equal to or greater than 0.06, or equal to or greater than 0.07, or equal to or greater than 0.08. For example, the length ratio S/L may be in the range from 0.05 to 0.14, optionally in the range from 0.05 to 0.13, optionally in the range from 0.06 to 0.13, and optionally in the range from 0.08 to 0.13.

The core shaft may have a running speed range with a lower bound of 1500 rpm and an upper bound of 6200 rpm.

The bearing stiffness of the forwardmost rearward bearing may be in the range of 30 kN/mm to 100 kN/mm. Optionally, bearing stiffness of the forwardmost rearward bearing may be at least substantially equal to 50 kN/mm.

The gas turbine engine may further comprise a stationary supporting structure and a first bearing support structure. The forwardmost rearward bearing may be mounted to the stationary supporting structure by the first bearing support structure. The first bearing support structure may be attached to the stationary supporting structure at a first position located axially rearward of the forwardmost rearward bearing.

In such embodiments, the first bearing support structure may comprise a plurality of connecting members, which may be spaced circumferentially around the engine axis. The connecting members may connect the forwardmost rearward bearing to the stationary support structure.

Additionally or alternatively, in such embodiments, the first bearing support structure may comprise an outer race of the forwardmost rearward bearing.

In embodiments with a first bearing support structure, the engine may further comprise a second bearing support structure. The second bearing support structure may be mounted to the stationary supporting structure, optionally at a second position located forward of, and at a larger radial distance from the engine axis than, the first position. The second bearing support structure may be connected to the first bearing support structure by a squeeze film damper in the region of the forwardmost rearward bearing.

The length, L, of the core shaft may be in the range from 1800 mm to 2900 mm or 2750 mm. The minor span may be in the range from 250 mm to 350 mm, optionally from 260 mm to 350 mm.

The fan may have a fan diameter in the range from 330 cm to 380 cm.

The length, L, of the core shaft may be in the range from 1800 mm to 2900 mm or 2750 mm and the minor span in the range from 250 mm to 350 mm, optionally from 260 mm to 350 mm. The running speed of the core shaft may be in the range from 1500 rpm to 6200 rpm; and/or a diameter of the fan may be in the range from 330 cm to 380 cm and the gear ratio of the gearbox in the range from 3.1 to 3.8. The length, minor span and/or running speed may be selected such that no primary resonance of the core shaft lies within the running range of the engine.

The rearward bearings may be positioned axially level with or rearward of a leading edge of a lowest pressure turbine blade of the turbine at the root of the blade.

The rearward bearings may be positioned axially level with or rearward of a trailing edge of a turbine blade of a third set of turbine blades from the front of the turbine, at the root of the blade. In such embodiments, the turbine may comprise four sets of turbine blades.

The lowest pressure turbine of the engine may have a lowest pressure set of blades, each blade of the lowest pressure set of blades having a mass, m, a radius at blade mid-height, r, and an angular velocity at cruise, $\omega$. The minor span (S) is defined as the axial distance between the two rearward bearings, as described elsewhere.

A first blade to bearing ratio of:

$$\frac{\text{the minor span } (S)}{mr\omega^2} \text{ (for a blade of the lowest pressure set)}$$

may have a value in the range from $2.0\times10^{-6}$ to $7.5\times10^{-6}$ kg$^{-1}\cdot$rad$^{-2}\cdot$s$^2$, optionally from $3.0\times10^{-6}$ to $7.5\times10^{-6}$ kg$^{-1}\cdot$rad$^{-2}\cdot$s$^2$, optionally from $4.0\times10^{-6}$ to $7.5\times10^{-6}$ kg$^{-1}\cdot$rad$^{-2}\cdot$s$^2$, optionally from $5.0\times10^{-6}$ to $7.5\times10^{-6}$ kg$^{-1}\cdot$rad$^{-2}\cdot$s$^2$, optionally from $2.0\times10^{-6}$ to $6.5\times10^{-6}$ kg$^{-1}\cdot$rad$^{-2}\cdot$s$^2$, optionally from $3.0\times10^{-6}$ to $6.5\times10^{-6}$ kg$^{-1}\cdot$rad$^{-2}\cdot$s$^2$, and further optionally from $4.5\times10^{-6}$ to $6.5\times10^{-6}$ kg$^{-1}\cdot$rad$^{-2}\cdot$s$^2$.

A second blade to bearing ratio of:

$$\frac{\text{the minor span } (S)}{m \times r} \text{ (for a blade of the lowest pressure set 19}c, 19d)$$

may have a value in the range from 0.8 to 6.0 kg$^{-1}$, optionally from 0.8 to 5.0 kg$^{-1}$, optionally from 0.8 to 4.0 kg$^{-1}$, optionally from 0.8 to 3.0 kg$^{-1}$, optionally from 0.8 to 2.0 kg$^{-1}$.

The turbine has a length between the leading edge of the forwardmost turbine blade of the turbine and a trailing edge of the rearmost turbine blade of the turbine. A minor span to turbine length ratio (minor span divided by turbine length) may be equal to or less than 1.05, optionally equal to or less than 1.00, optionally equal to or less than 0.95. The minor span to turbine length ratio may be equal to or greater than 0.70, or equal to or greater than 0.75, or equal to or greater than 0.80, or equal to or greater than 0.85. For example the minor span to turbine length ratio may be in the range from 0.70 to 1.05, optionally from 0.70 to 1.00, optionally from 0.70 to 0.95, optionally from 0.80 to 1.05, optionally from 0.80 to 1.00, optionally from 0.80 to 0.95, optionally from 0.85 to 1.05, optionally from 0.85 to 1.00, and further optionally from 0.85 to 0.95.

In any of the aspects described above, one or more of the following features may be present:

The turbine may be a first turbine, the compressor may be a first compressor, and the core shaft may be a first core shaft. The engine core may further comprise a second turbine, a second compressor, and an interconnecting shaft connecting the second turbine to the second compressor. The second turbine, second compressor, and second core shaft may be arranged to rotate at a higher rotational speed than the first core shaft.

The engine may further comprise a tail bearing housing located rearward of the turbine. The tail bearing housing may comprise two bearing discs; each bearing disc may be arranged to support one of the two rearward bearings. In alternative embodiments, the tail bearing housing may comprise a single bearing disc, the bearing disc being arranged to support one of the two rearward bearings (for example the rearmost bearing).

In embodiments with one or more bearing discs, one or more of the bearing discs may be oriented at least substantially perpendicular to the engine axis (i.e. at least substantially in a radial plane through the engine)

In the various aspects and embodiments described herein, the engine running range may be defined as the range of rotation rates of the core shaft during standard operation of the engine (e.g. during ground idle, take-off, climb and cruise), and may be measured in rotations per minute (rpm). In this context "standard operation of the engine" may exclude transient periods on start-up and shut down, e.g. as core shaft rotation rate increases from zero to the ground idle rotation rate. The engine running range includes the ground idle speed, cruise speed, and maximum take-off (MTO) speed. The core shaft rotation rate may be greater than or equal to the ground idle rotation rate throughout standard operation of the engine. The core shaft rotation rate during standard operation of the engine may also be referred to as the core shaft running speed.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

As used herein, a maximum take-off (MTO) condition has the conventional meaning. Maximum take-off conditions may be defined as operating the engine at International Standard Atmosphere (ISA) sea level pressure and temperature conditions +15° C. at maximum take-off thrust at end of runway, which is typically defined at an aircraft speed of around 0.25 Mn (i.e. a Mach number of 0.25), or between around 0.24 and 0.27 Mn. Maximum take-off conditions for the engine may therefore be defined as operating the engine at a maximum take-off thrust for the engine at ISA sea level pressure and temperature +15° C. at an aircraft speed of 0.25 Mn.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number, Mn) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which:

FIGS. 15A and 15B illustrate bearing stiffness determination, in particular showing the application of a radial force and the resultant displacement;

FIG. 16 illustrates a method of obtaining a gas turbine engine as described herein;

FIG. 17 is a graph of displacement against load, illustrating an elastic region within which stiffnesses of components may be determined;

FIG. 18 illustrates a method of designing a gas turbine engine as described herein;

FIG. 19 is a schematic view of the mounting of two bearings shown in FIG. 9, with bearing disc angles marked; and FIG. 20 is a schematic view of a different mounting of two bearings from that shown in FIG. 9, with corresponding bearing disc angles marked.

Figure 1:
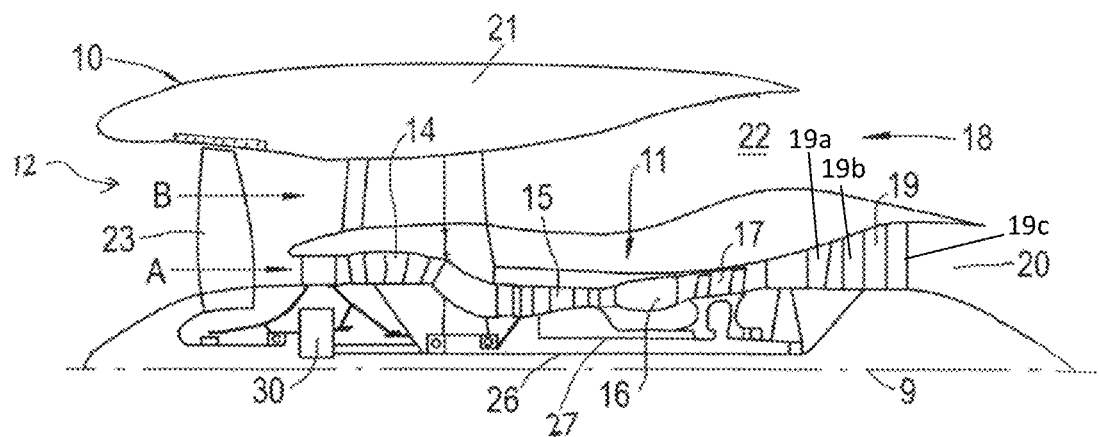
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a core shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
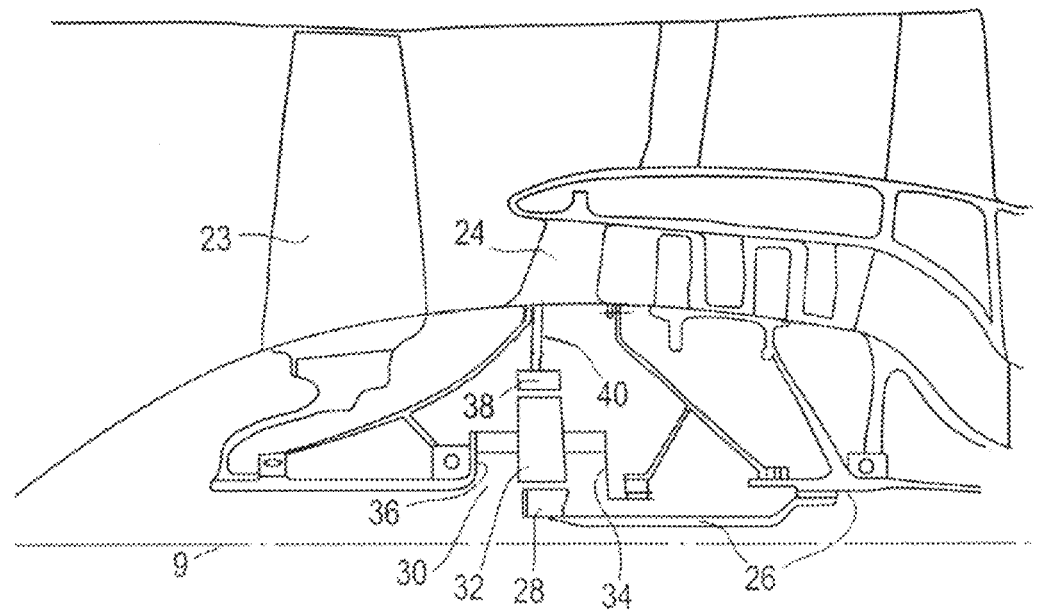
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the core shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a fixed structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
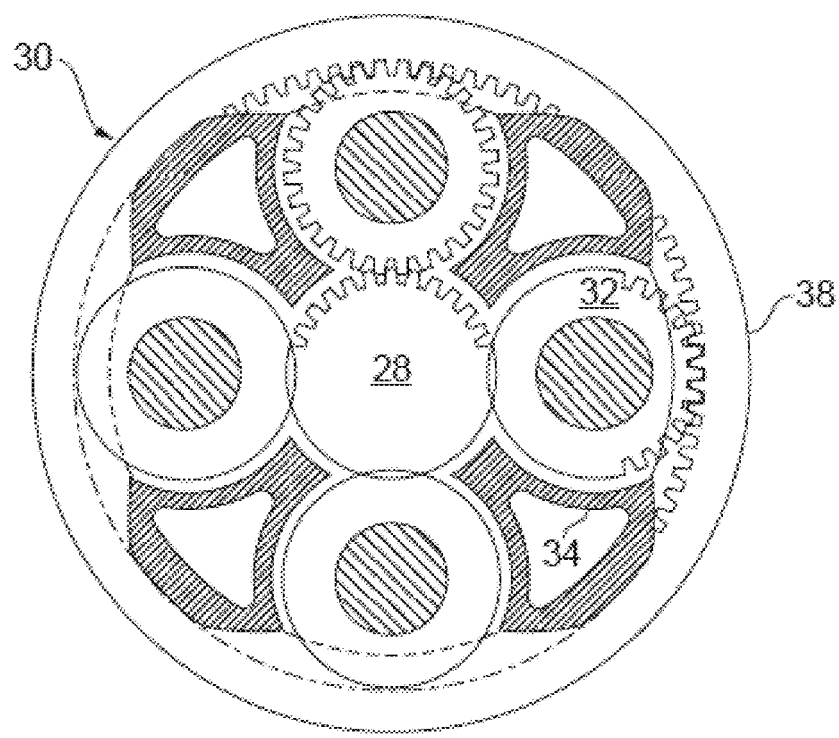
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft (core shaft 26), the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In the embodiments being described, the engine 10 is a geared gas turbine engine, having a gearbox 30.

The fan 23 is attached to and driven by the low pressure turbine 19 via the core shaft 26 and an epicyclic gearbox 30. The core shaft 26 is supported by three bearings 26a, 26b, 26c, the three bearings comprising a forward bearing 26a and two rearward bearings 26b, 26c. In alternative embodiments, more bearings 26a-c may be provided. The forward bearing 26a may be referred to as the first bearing, the forwardmost 26b of the two rearward bearings 26b, 26c as the second bearing, and the rearmost 26c of the two rearward bearings 26b, 26c as the third bearing.

The forward bearing 26a is the location bearing 26a for the core shaft 26; i.e. it is the one bearing on the core shaft arranged to limit axial movement of the core shaft 26 as well as radial movement, so locating the core shaft axially. The forward bearing 26a is mounted on the fixed structure so as to axially locate the core shaft 26. The skilled person would appreciate that having multiple location bearings on a single shaft may cause the shaft to bend deleteriously, or otherwise deform, on expansion in use, and that use of a single location bearing per shaft is therefore generally favoured.

In the embodiment being described, the forward bearing 26a is the core shaft bearing 26a nearest the front of the engine 10. In alternative embodiments, there may be one or more other bearings, e.g. roller bearings, on the core shaft 26 forward of the forward bearing 26a, however any such bearings are not location bearings—i.e. whilst they may assist in radially locating the core shaft 26, the core shaft can move axially relative to these bearings.

In the embodiments being described, the forward bearing 26a is the core shaft bearing 26a nearest, and rearward of, the gearbox 30. The forward bearing 26a is axially level with, or near, the exit from the compressor 14 in the embodiment being described. In alternative embodiments, the forward bearing 26a may be located forward of the gearbox 30, however the proximity of the forward bearing 26a to a roller bearing of the fan 23 may increase complexity.

The forward bearing 26a is mounted on the fixed structure.

The rearward bearings 26b, 26c are the next two core shaft bearings, rearward of the forward bearing 26a. In the embodiment being described, the rearward bearings 26b, 26c are the core shaft bearings nearest the rear of the engine 10. In alternative embodiments, an additional bearing may be located rearward of these bearings.

Figure 4:
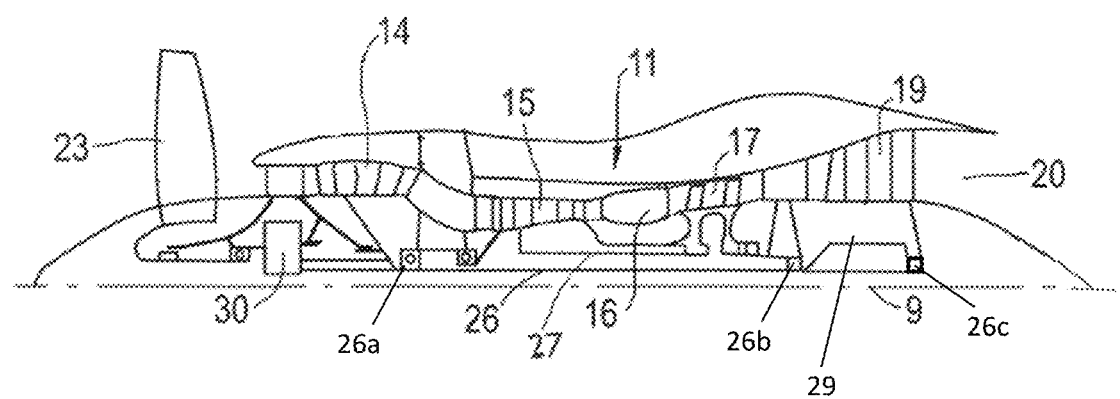
FIG. 4 is a sectional side view of a gas turbine engine illustrating three bearings on the core shaft.

In the embodiment shown in FIG. 4, both rearward bearings 26b, 26c are mounted on the tail bearing housing 29. The tail bearing housing 29 is a structure arranged to be non-rotating with respect to the fixed structure, and to support bearings 26b, 26c of the core shaft 26. The tail bearing housing 29 comprises two bearing discs 29a, 29b. Each disc 29a, 29b is arranged to support one of the two rearward bearings 26b, 26c.

In the embodiment shown in FIG. 4, the rearmost bearing 26c of the two rearward bearings 26b, 26c is located axially level with, or near, the exit from the low pressure turbine 19. More specifically, the rearmost bearing 26c is at least substantially axially level with a rearmost/lowest pressure rotor of the low pressure turbine 19 in the embodiment being described.

Figure 5:
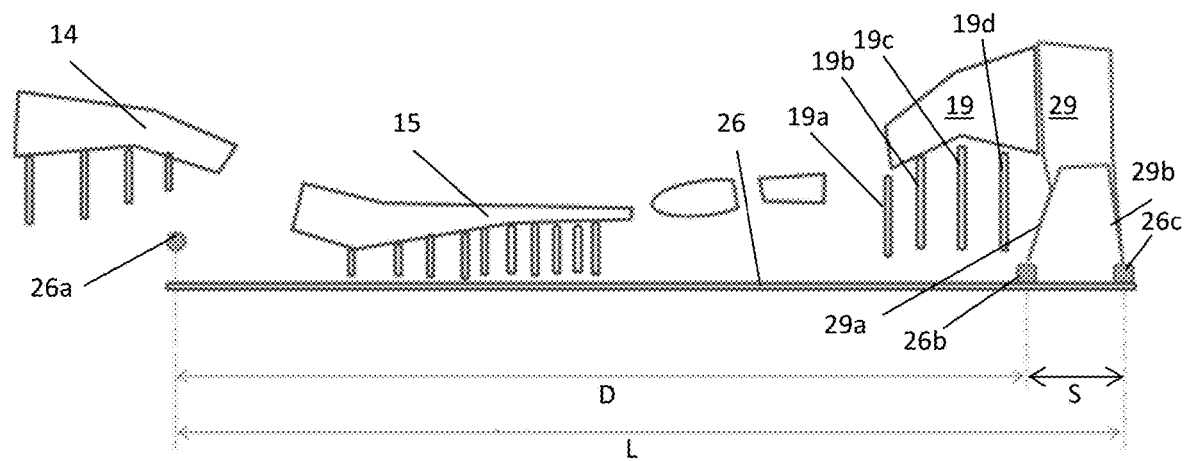
FIG. 5 is a schematic side view of a gas turbine engine illustrating the major and minor spans between the bearings.
Figure 6:
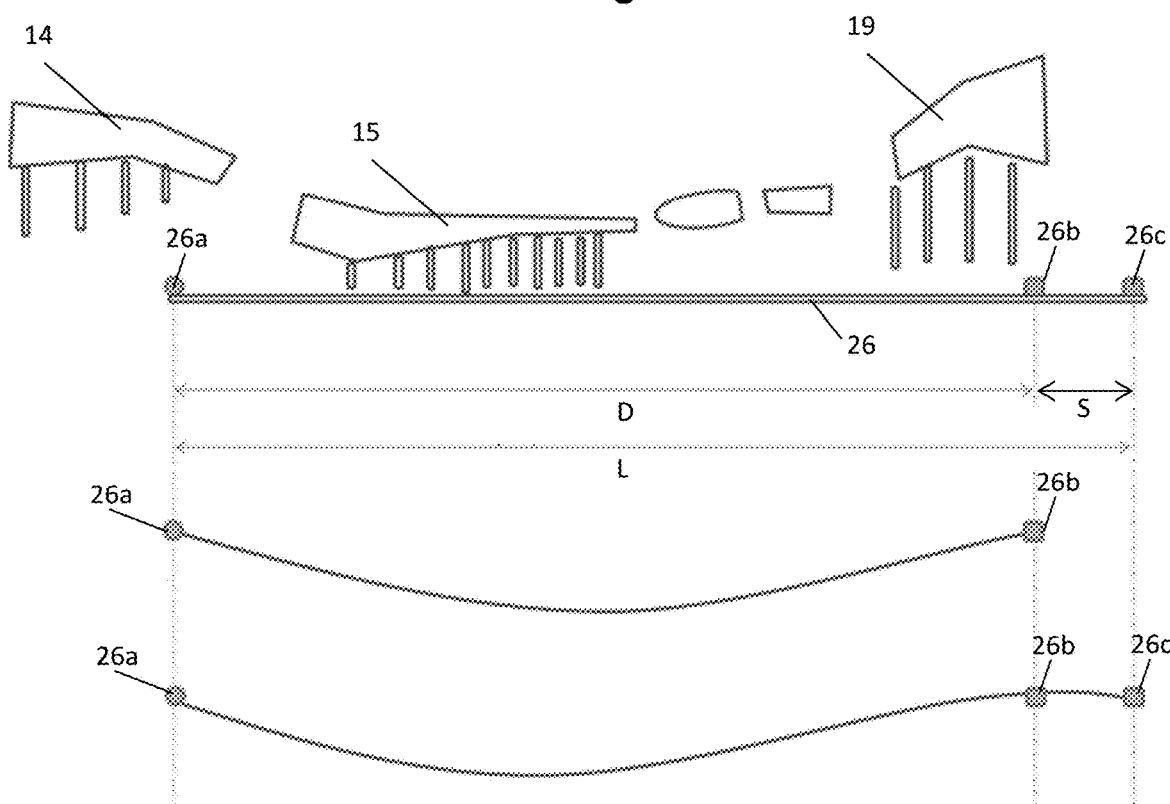
FIG. 6 illustrates bending modes of the core shaft for two different bearing configurations.
Figure 7:
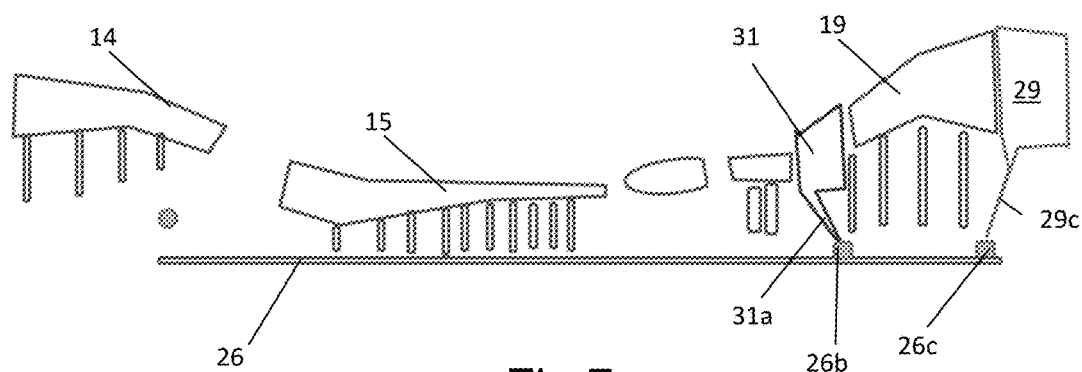
FIG. 7 is a schematic side view of a gas turbine engine illustrating an alternative bearing arrangement to that shown in FIG. 5.

In various alternative embodiments, such as that shown in FIGS. 5 to 7, one or both of the two rearward bearings 26b, 26c may be provided axially downstream of the leading edge of the lowest pressure set of blades 19d of the low pressure turbine 19, at the root of the blade.

In embodiments such as that shown in FIGS. 1 and 4, the low pressure turbine 19 may have three stages; i.e. three sets of rotor blades 19a, 19b, 19c. Each set of rotor blades has a corresponding axial position along the engine axis 9, and is offset from the axial position of the other sets. The most upstream, or axially forward-most, set of blades is the highest pressure set of blades of the low pressure turbine 19, and may be referred to as the first set of blades. The most downstream, or axially rear-most, set of blades is the lowest pressure set of blades of the low pressure turbine 19, and may be referred to as the last, or in these embodiments third, set of blades. The middle set of blades 19b of the three sets may be referred to as the second set of blades.

In embodiments such as that shown in FIGS. 5 and 6, the low pressure turbine 19 may have four stages; i.e. four sets of rotor blades 19a, 19b, 19c, 19d. The most upstream, or axially forward-most, set of blades is the highest pressure set of blades of the low pressure turbine 19, and may be referred to as the first set of blades 19a. The most downstream, or axially rear-most, set of blades 19d is the lowest pressure set of blades of the low pressure turbine 19, and may be referred to as the last, or in these embodiments fourth, set of blades. The middle sets of blades 19b, 19c of the four sets may be referred to as the second and third sets of blades, respectively. In alternative embodiments, the turbine 19 may have less than three or more than four sets of blades, for example having two sets or five sets.

A length of the low pressure turbine 19 may be defined as the distance between a leading edge of a blade 19a of the first set of blades of the low pressure turbine and a trailing edge of a blade 19c/19d of the last set of blades of the low pressure turbine. A casing of the low pressure turbine 19 may extend beyond the span between the first (highest pressure) and last (lowest pressure) blades.

Figure 12:
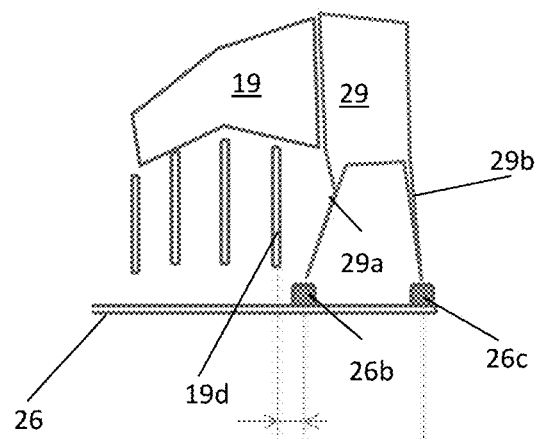
FIG. 12 is a close-up view of the bearing housing shown in FIG. 5.

In various embodiments with the two rearward bearings 26b, 26c provided axially downstream of the leading edge of the lowest pressure blade 19c, 19d of the low pressure turbine 19 at the root of the blade, the length ratio (as described below) and/or the core shaft running speed may or may not be within the ranges detailed elsewhere herein. In such embodiments, the two rearward bearings 26b, 26c may be provided axially downstream of the centreline of a disc supporting the lowest pressure turbine blade 19d of the low pressure turbine 19, as illustrated in FIG. 12. In such embodiments, the length, L, of the core shaft may be in the range 1800-2900 mm, optionally 2300-2800 mm, and further optionally 2400-2750 mm.

In various embodiments, the low pressure turbine 19 may be a four stage turbine 19, having four sets 19a-d of rotor blades, for example as described above with respect to FIGS. 5 and 6. The forwardmost set of rotor blades 19a may be defined as the first set and the rearmost 19d as the fourth set. The two rearward bearings 26b, 26c may be provided axially downstream of the trailing edge of a low pressure turbine blade of the third set 19c at its root. One or both of the two rearward bearings 26b, 26c may be provided axially upstream of the leading edge of the lowest pressure turbine blade 19d (a blade of the fourth set) of the low pressure turbine 19 at the root of the blade in such embodiments. Pressure decreases across the low pressure turbine 19—the first set of blades 19a may therefore be described as the highest pressure set of blades of the low pressure turbine 19, and the fourth set of blades as the lowest pressure blades.

In various such embodiments, the length ratio and/or the core shaft running speed may or may not be within the ranges detailed elsewhere herein. In such embodiments, the length, L, of the core shaft may be in the range 1800-2900 mm, optionally 2300-2800 mm, and further optionally 2400-2750 mm.

In the low pressure turbine 19, turbine blades 19a-d within each set are designed to be identical (within manufacturing tolerances). Blades may differ, for example in size and/or shape, between different sets. Each blade within a set 19d has a mass, m, and a turbine blade radius at mid-height, r. Generally, the heavier and larger blades are in the sets towards the rear of the turbine. The turbine blades each have a mid-height position, at which the mid-height radius is measured. The mid-height position is half way between a radially innermost point and a radially outermost point on the blade leading edge. The turbine blade radius at mid-height is measured in a radial direction between an axial centreline 9 of the engine 10 and the mid-height position.

Each blade 19a-d also has a maximum-rated angular velocity, ω, which may also be referred to as a Maximum Take-Off (MTO) speed. The MTO speed may be the maximum angular velocity at which the shaft is designed to spin. ω may be in between 5000 and 9000 rpm, optionally in the range from 5000 to 8000 rpm or from 5000 to 7000 rpm, and optionally around 5500, 6000 (i.e. around 630 radians per second), or 6500 rpm.

A value, Y, may be defined as follows:

$Y = mr\omega^2$

Y may have units of kg·m·rad$^2$·s$^{-2}$. In some embodiments, the value of Y for the lowest pressure set of blades 19c (for a three-stage turbine), 19d (for a four-stage turbine) of the low pressure turbine 19 is in the range of from 45000 to 100000 kg·m·rad$^2$·s$^{-2}$, optionally in the range of from 50000 to 100000 kg·m·rad$^2$·s$^{-2}$, optionally in the range of from 55000 to 100000 kg·m·rad$^2$·s$^{-2}$, and further optionally in the range of from 60000 to 100000 kg·m·rad$^2$·s$^{-2}$. In such embodiments, the mass, m, of each blade of the last set may be in the range from 0.2 kg to 0.6 kg, and optionally may be around 0.4 kg. The radius, r, of each blade of the last set at mid-height may be in the range from 400 mm to 600 mm, and optionally may be around 500 mm (0.5 m).

The value of Y may be thought of as providing a measure of the magnitude of the centripetal force ($F_c$) acting on the blade when rotating at the MTO speed:

$$F_c = ma_c = \frac{mv^2}{r} = m\omega^2 r$$

where $a_c$ is the centripetal acceleration and v is the linear velocity, which is equal to ωr.

The skilled person would appreciate that a higher centripetal force ($F_c$) acting on the blade may increase the risk of a blade-off event for that blade.

The minor span, S, is the distance between the two rearmost bearings, and may be in the range from 250 mm to 350 mm, optionally in the range from 275 mm to 325 mm, and further optionally may be around 300 mm.

A first blade to bearing ratio may be defined as:

$$\frac{\text{the minor span, } S}{Y \text{ for the lowest pressure set of blades 19}c, 19d}$$
$$\text{of the low pressure turbine 19}$$

The first blade to bearing ratio may be in the range of from 2.0×10$^{-6}$ to 7.5×10$^{-6}$ kg$^{-1}$·rad$^{-2}$·s$^2$, and optionally in the range from 3.0×10$^{-6}$ to 4.5×10$^{-6}$ kg$^{-1}$·rad$^{-2}$·s$^2$. The value of this ratio may be lower than that for traditional engines as the minor span, S, is smaller compared to the value of Y. The skilled person would appreciate that increasing angular velocity in flight may improve engine efficiency, and that the MTO speed provides a measure of a maximum rotation speed, and resultantly a maximum force (indicated by Y), available from an engine 10. However, the inventor appreciated that the engine 10 should not be linearly scaled up with a force increase (Y providing a measure of force), but rather that the minor span length should be increased as little as possible so as to relatively reduce engine length and weight, so allowing the efficiency gains to be increased by avoiding the additional weight, and to avoid the development of unwanted whirl modes within the minor span. Whilst conventional wisdom suggests that a larger minor span is desirable to improve reaction of forces from the low pressure turbine 19, the inventor found that the risk of introducing whirl modes, and the introduction of more length and weight, counterbalanced the force reaction benefits.

In alternative or additional embodiments, a second blade to bearing ratio may be defined as:

$$\frac{\text{the minor span, } S}{mr \text{ (for the lowest pressure set of blades 19}c, 19d}$$
$$\text{of the low pressure turbine 19)}$$

The value of the blade mass, m, multiplied by the blade radius, r, may be in the range from 180 to 280 kg·mm. The minor span, S, i.e. the distance between the two rearmost bearings, may be in the range from 250 mm to 350 mm. In various embodiments, the minor span may be greater than or equal to any of 250 mm, 255 mm, 260 mm and 265 mm. In various embodiments, the minor span may be smaller than or equal to any of 350 mm, 345 mm, 340 mm, or 335 mm. The second blade to bearing ratio may be in the range from 0.8 to 6.0 kg$^{-1}$, and optionally in the range from 0.9 to 3.9 kg$^{-1}$, and further optionally in the range from 1.2 to 2.6 kg$^{-1}$. In such embodiments, the gear ratio of the gearbox 30 may be greater than 3, and optionally in the range from 3.1 to 3.8.

In such embodiments, the running speed of the engine 10/of the core shaft 26 may be in the range of 5400-5700 rpm (i.e. around 565 to 597 radians per second), and optionally of 5500-5600 rpm, at cruise. Additionally or alternatively, the running speed of the core shaft 26 may be in the range of 5800-6200 rpm, and optionally of 5900-6100 rpm, at MTO.

In such embodiments, the length, L, of the core shaft 26 may be in the range 1800-2900 mm, optionally 2000-2900 mm, further optionally 2300-2800 mm, and further optionally 2400-2750 mm.

In particular, in the embodiment shown in FIGS. 5 and 6, both rearward bearings 26b, 26c are mounted on the tail bearing housing 29. The tail bearing housing 29 is located axially rearward of the low pressure turbine 19. Two bearing discs 29a, 29b extend from the tail bearing housing 29. Whilst the forwardmost bearing disc 29a of the bearing housing 29 of this embodiment is angled forward of the tail bearing housing 29, extending towards and, in this case, within the housing of, the low pressure turbine 19, the forwardmost bearing 26b of the rearward bearings, which is mounted on the forwardmost bearing disc 29a, is nonetheless located axially rearward of the leading edge of the lowest pressure turbine blade of the low pressure turbine 19, at the root of the blade. The rearmost bearing 26c of the rearward bearings, which is mounted on the rearmost bearing disc 29b, is located axially rearward of the low pressure turbine 19.

In the embodiment shown in FIG. 7, the tail bearing housing 29 has just one bearing disc 29c extending therefrom. The single bearing disc 29c is located in a similar position and has a similar shape to the forwardmost bearing disc 29a of the embodiment shown in FIGS. 5 and 6, but this time supports the rearmost bearing 26c of the rearward bearings, holding that bearing 26c axially rearward of the leading edge of the lowest pressure turbine blade of the low pressure turbine 19. The forwardmost bearing 26b of the rearward bearings is mounted on a forward bearing housing 31 instead of on the tail bearing housing 29. The forward bearing housing 31 has a single bearing disc 31a arranged to support the forwardmost 26b of the rearward bearings. The forwardmost 26b of the rearward bearings is located forward of, and adjacent to, the low pressure turbine 19 in this embodiment. The forwardmost 26b of the rearward bearings is held axially level with a part of the low pressure turbine 19, and more specifically axially level with the leading edge of the highest pressure turbine blade of the low pressure turbine 19, in this embodiment. The core shaft 26 may be shorter overall in such embodiments with only one rearward bearing 26c rearward of the leading edge of the lowest pressure turbine blade of the low pressure turbine 19, as the core shaft 26 may not extend as far rearward of the low pressure turbine 19 given that the minor span, S, is located at least partially axially level with the low pressure turbine 19, rather than strictly rearward of the low pressure turbine 19 (more specifically, of the leading edge of the lowest pressure turbine blades of the low pressure turbine 19).

A length, L, of the core shaft 26 may be defined between the forward bearing 26a and the rearmost rearward bearing 26c, as marked in FIGS. 5 and 6 (i.e. between the first and third bearings). This length, L, may be referred to as a major span of the core shaft 26, or an inter-bearing length of the core shaft 26. In the embodiment being described, the length, L, of the core shaft 26 is in the range 1800-2900 mm, more particularly in the range 2300-2800 mm, and still more particularly in the range 2400-2750 mm.

The minor span, S, of the core shaft 26 may be defined as the distance between the rearward bearings 26b, 26c (i.e. between the second and third bearings on the core shaft 26).

The minor span, S, is equal to the length, L, of the core shaft 26 minus the distance, D, between the forward bearing 26a and the first rearward bearing 26b (i.e. minus the distance between the first and second bearings on the core shaft 26).

A length ratio of the core shaft may be defined as:

$$\frac{\text{minor span }(S)}{\text{core shaft length }(L)}$$

In various embodiments, the bearings 26a-26c are arranged such that the length ratio of the minor span to the core shaft length is in the range from 0.08 to 0.14, and optionally in the range from 0.08 to 0.13. In various embodiments, the core shaft 26 may have any suitable length ratio, for example being in the range of from 0.09 to 0.13, or 0.10 to 0.12, or for example being on the order of or at least 0.08, 0.09, 0.10, 0.11, 0.12, 0.13 or 0.14. The core shaft length ratio may be, for example, between any two of the values in the previous sentence.

The inventor appreciated that the ratio of the distance between the rear two bearings 26b, 26c to the shaft length, L, may be a significant parameter in controlling the rotordynamic behaviour of the core shaft 26.

The value of this length ratio for engines 10 of various embodiments may be relatively low compared with previous engines.

As the engine 10 gets bigger, the core shaft 26 gets longer—however, increasing the distance, S, between the two rear bearings 26b-c (the minor span) linearly with the increase in shaft length, L, may result in deleterious effects. Once the minor span, S, reaches a certain length, there may be no benefit in lengthening that distance in terms of effects on the portion of the core shaft 26 located between the first 26a and second 26b bearings and/or in terms of reaction to the moments of the bearing discs 29a-b, 31a. Indeed, if that distance, S, is increased linearly with core shaft length, L, the minor span may become long enough to have whirl modes (as described below with respect to FIG. 11) between the second and third bearings 26b, within the engine running range, so potentially worsening the unwanted movement.

Figure 8:
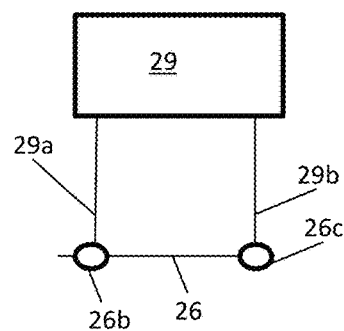
FIG. 8 is a schematic view of the mounting of two bearings on a tail bearing housing.
Figure 9:
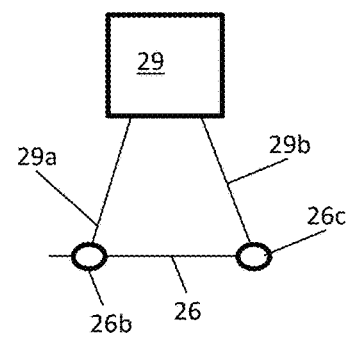
FIG. 9 is a schematic view of the mounting of two bearings on a tail bearing housing of a different arrangement from that shown in FIG. 8.

Additionally or alternatively, a relatively large tail bearing housing (TBH) 29 may be used to accommodate the wider minor span, S, between bearings 26b, 26c, as shown in FIG. 8. A larger TBH 29 may add unwanted weight and/or bulk to the engine 10. Alternatively or additionally, the bearing discs 29a, 29b may be more widely angled to accommodate the wider minor span between bearings 26b, 26c, as shown in FIG. 9. The bearing discs 29a, 29b being angled further away from a direction perpendicular to the engine axis 9/parallel to a radius may be a suboptimal solution from a structural point of view—for example the moment of the bearing discs may not be reacted as well as in the embodiment shown in FIG. 8. Alternatively or additionally, one of the bearings 29a, 29b may be located on a different bearing structure 31, instead of the TBH 29.

In various embodiments, the bearing discs 29a,b, 31a, be they on the TBH 29 or on a separate bearing structure 31, may be oriented at least substantially perpendicular to the engine axis 9, for example having an angle (Θ) to a radius of the engine 10 of between 0° and 20°, and optionally between 0° and 15° (i.e. an angle to the axis 9 of the engine of between 90° and 70°, and optionally between 90° and 75°).

In embodiments such as that shown in FIGS. 9 and 19, the bearing discs 29a, 29b each extend inwards towards the engine axis 9 from the rest of the TBH 29 at an at least substantially constant angle (the bearing discs 29a, 29b may for example comprise a solid disc or a series of circumferentially spaced struts around the axis extending between inner and outer rings). An angle, $\Theta_1$, $\Theta_2$, can therefore be defined between the disc 29a, 29b and a radial direction. In other embodiments, such as those shown in FIG. 20, a bearing disc 29a, 29b may comprise two or more portions extending at different angles (as shown by way of example only with three portions for the forwardmost bearing disc 29a and two portions of the rearward bearing disc 29b in FIG. 20). In such cases, the angle selected is that for the portion with the longest radial extent, as marked for the two examples shown in FIG. 20. In embodiments in which there is not a single portion with a greater radial extent than the other portion(s), an average angle may instead be taken across the two or more portions with the greatest radial extent.

In the embodiments being described, the core shaft 26 has a running speed range with a lower bound of 1500 rpm (e.g. at ground idle) and an upper bound of 6200 rpm (e.g. at Maximum Take-Off—MTO). In particular, in various embodiments the core shaft running speed at cruise lies within the range 5400-5700 rpm, and optionally within the range 5500-5600 rpm. At MTO, the core shaft running speed may lie in the range 5800-6200 rpm, and optionally within the range 5900-6100 rpm. The running speed range at cruise for a particular aircraft is generally well below a maximum rated rotation rate for the core shaft 26 of that aircraft (the MTO speed). The engine 10 may operate within the MTO running speed range for relatively short time durations—e.g. five or ten minutes—during normal operation.

FIG. 6 illustrates the stiffening effect on the core shaft 26 obtained by the arrangement of bearings 26a-26c as described herein, and in particular of the use of two rearward bearings 26b, 26c. The positioning of the bearings is selected to control, or aid in controlling, the whirl modes of the engine 10.

In particular, the boundary condition on the core shaft 26 at the location of the second bearing 26b (the forwardmost rearward bearing) may be changed by the extension of the core shaft 26 beyond the second bearing 26b to the third bearing 26c (the rearmost rearward bearing). This may change the boundary condition at the second bearing 26b from a simply-supported/pinned boundary condition to a cantilever boundary condition, affecting the shape of the core shaft 26 when it bends. This effect can be seen most clearly immediately to the left of the second bearing 26b as shown in FIG. 6—in the upper, two bearing, configuration (pinned-pinned boundary conditions), the angle of the core shaft at the second bearing 26b is steeper than in the lower, three bearing, configuration (pinned-cantilever boundary conditions), in which the shaft 26 is closer to being horizontal on entering the second bearing 26b.

In rotordynamics, the critical speed is the theoretical angular velocity that excites the natural frequency of a rotating object, such as a shaft (like the core shaft 26). Higher frequency whirl modes may also be induced (for example at double the natural/resonant frequency). Engines 10 of the embodiments being described may be susceptible to having whirl modes (resonance frequencies) within or near the engine running range, which may cause unwanted and potentially deleterious movement of the core shaft 26, as is illustrated in FIG. 6. This coincidence of whirl modes with the engine running range may be a result of the longer core shaft 26 of the larger engine 10.

Whilst diameter and/or thickness of the core shaft 26 could be changed to increase the stiffness and therefore push the whirl modes out of the engine running range, the resultant increase in size and/or weight, and/or knock-on effects on other components, may remove or reduce the feasibility of this option. For example, the core shaft diameter may be constrained by other engine components located radially outward of the core shaft 26 (for example, the core shaft 26 is radially inward with respect to the interconnecting shaft 27 connecting the second (high pressure) turbine 17 to the second (high pressure) compressor 15 in the embodiments being described).

In the embodiments being described, the low pressure turbine 19 drives a low pressure compressor 14 directly, and drives a fan 23 indirectly via a reduction gearbox 30. A higher pressure system 15, 17, comprising a high pressure compressor 15 and a high pressure turbine 17, as well as an interconnecting shaft 27 between them, is located between the low pressure compressor 14 and the low pressure turbine 19. The core shaft 26 is therefore longer than the interconnecting shaft 27 as it extends across the full length of the higher pressure system 15, 17 and the additional length of the low pressure system 14, 19.

The relatively long length, L, of the core shaft 26, as compared to previous engine architectures, reduces the core shaft's natural frequency, bringing the natural frequency within the operational speed of the engine 10, as the natural frequency is inversely proportional to the major span (core shaft length L).

Figure 11:
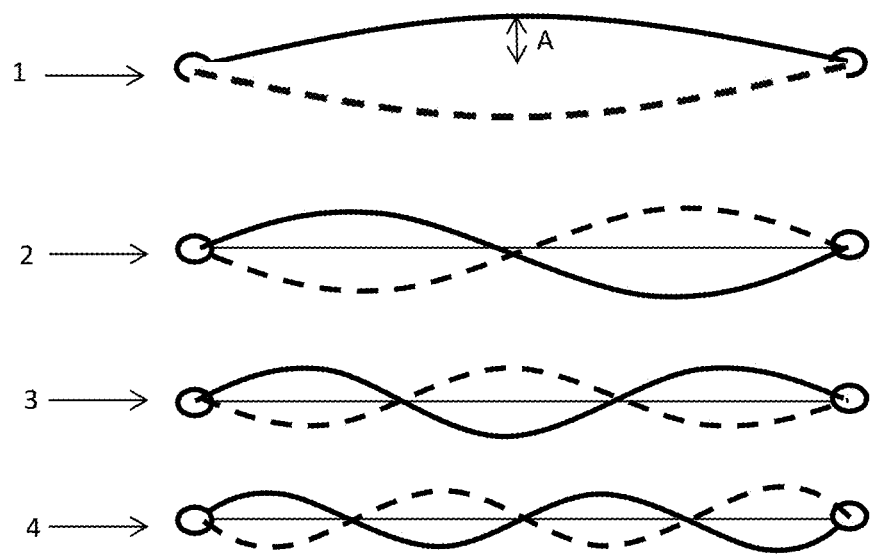
FIG. 11 illustrates the first four resonance frequencies of a beam.

Natural frequencies exist in various modes (which may be termed whirl modes), as illustrated in FIG. 11. A primary resonance (mode 1) has a total of two nodes (non-moving points), one at each constrained end (the bearings 26a, 26b on the shaft 26). A secondary resonance (mode 2) has one additional node in the centre (a total of three nodes). A third resonance mode (mode 3) has four nodes, and a fourth resonance mode (mode 4) has five nodes, etc. The nodes are evenly spaced along the span of the shaft 26 between the constrained ends 26a, 26b. The amplitude decreases with increasing mode number—the maximum amplitude of the mode 1 resonance is greater than that of the mode 2 resonance, etc. The primary resonance may therefore be the most damaging, as it causes the maximum radial displacement of the shaft 26. Avoiding operating speeds likely to trigger the primary resonance—by moving the primary resonance out of the operating speed range—may therefore be of particular interest.

The relationship of natural frequency of a simply-supported (pinned) beam to the length of the beam is given by:

$$f_n = \frac{K_n}{2\pi}\sqrt{\frac{EIg}{wl^4}}$$

where:
n is the mode number (with mode 1 having nodes at each pinned end only, as illustrated in FIG. 6, mode 2 having an additional node at the mid-point between the ends, etc.);
$f_n$ is the frequency of the $n^{th}$ mode (the resonance frequency), measured in Hz;

$K_n$ is a dimensionless factor dependent on the order of the mode, n, and also on the applicable boundary conditions, and can be derived for various boundary conditions as detailed in, for example, "*Roark's Formulas for Stress and Strain,*" Warren C. Young and Richard G. Budynas, Seventh Edition.

E is the modulus of elasticity of the beam (N/m²);
I is the area moment of inertia of the beam (m⁴);
g is the acceleration due to gravity (m/s²);
l is the length of the beam between the pinned ends (m); and
w is the load per unit length on the core shaft (N/m).

The nodal positions (as a function of length of the beam, l) and values of $K_n$ for the first five modes may be as tabulated below in Table 1. The data in Table 1 are for a beam with both ends pinned (the boundary conditions), and $K_n$ is therefore equal to $(n\pi)^2$. For example, for the second mode, n=2 and $K_n=(2\pi)^2=39.5$ (to three significant figures).

TABLE 1

| Mode | $K_n$ | Nodal position/l | | | | |
|---|---|---|---|---|---|---|
| 1 | 9.87 | 0.0 | 1.00 | | | |
| 2 | 39.5 | 0.0 | 0.50 | 1.00 | | |
| 3 | 88.8 | 0.0 | 0.33 | 0.67 | 1.00 | |
| 4 | 158 | 0.0 | 0.25 | 0.50 | 0.75 | 1.00 |
| 5 | 247 | 0.0 | 0.20 | 0.40 | 0.60 | 0.80 | 1.00 |

The bending stiffness of the core shaft 26 is a function of both the material property and the area moment of inertia, I (geometric). The area moment of inertia for a tubular structure, such as the core shaft 26, is:

$$I = \frac{\pi}{4}(r_2^4 - r_1^4)$$

where $r_1$ and $r_2$ are the inner and outer radii of the tube, respectively.

In order to increase the frequency, the available options include using a stiffer material for the shaft 26, decreasing the length, L, of the shaft 26, or increasing the shaft diameter. The diameter and the shaft length are linked to the frequency by a quadratic function and therefore have the most influence for a change of a given magnitude. However, the diameter is restricted by a lack of available space within the engine 10.

Providing a second rearward bearing 26c modifies the boundary conditions to mimic a cantilever, as mentioned above—this change in boundary condition has a stiffening effect on the shaft 26, increasing its natural frequency. The change in boundary condition is reflected in a change in $K_n$, as shown in Table 2. In particular, the beam now has just one end pinned (simply supported), and the other fixed, so $$K_n = \pi^2(n + 1/4)^2$$

For the example of n=2, $K_n$ is therefore $(2.25)^2 \pi^2 = 50.0$ (to three significant figures).

TABLE 2

| Mode | $K_n$ | Nodal position/l | | | | |
|---|---|---|---|---|---|---|
| 1 | 15.4 | 0.0 | 1.000 | | | |
| 2 | 50.0 | 0.0 | 0.557 | 1.000 | | |
| 3 | 104 | 0.0 | 0.386 | 0.692 | 1.000 | |
| 4 | 178 | 0.0 | 0.295 | 0.529 | 0.765 | 1.000 |
| 5 | 272 | 0.0 | 0.239 | 0.428 | 0.619 | 0.810 | 1.000 |

Assuming all parameters except $K_n$ to be constants, it can be seen that a simple change to the boundary condition could increase the first Eigen frequency by over 50%.

The relative positioning of the core shaft bearings 26a-c may therefore be used to tune the stiffening effect to control the resonant frequencies.

A minor span to turbine length ratio may be defined as:

$$\frac{\text{minor span, } S}{\text{turbine length}}$$

In various embodiments, the minor span to turbine length ratio may be equal to or less than 1.05, optionally in the range from 0.85 to 1.05, and further optionally from 0.85 to 0.95.

In such embodiments, the length ratio and/or the core shaft running speed may or may not be within the ranges detailed elsewhere herein. Similarly, the rearward two bearings 26b, 26c may or may not be positioned rearward of various blades of the turbine 19 as detailed elsewhere herein. The skilled person will appreciate that various different approaches for controlling or modifying vibrational modes are disclosed herein, and that these approaches may be used individually or in any appropriate combination.

In various additional or alternative embodiments, the engine 10 may have a core shaft 26 with a length (L) between the forwardmost and rearmost bearings 26a, 26c in the range from 1800 to 2900 mm or 2750 mm, and an axial separation (minor span, S) between the two rear bearings 26b, 26c in the range from 250 mm to 350 mm, such that there is no natural frequency of the core shaft 26 with only two nodes (one at each end of the span between the first and second bearings 26a, 26b—a mode 1 frequency or primary resonance as shown in Tables 1 and 2 above) within the running range of the engine 10.

In such embodiments:
the core shaft 26 may have a running speed range with a lower bound of 1500 rpm and an upper bound of 6200 rpm; and/or
the fan 23 may have a fan diameter in the range from 330 cm to 380 cm (130-150") and the gearbox 30 may have a gear ratio between 3.1 and 3.8.

The core shaft length, L, and the distance, S, between the two rear bearings 26b, 26c, and the running speed may therefore be selected so that the core shaft 26 does not have a primary resonance mode between the first 26a and second 26b bearings within the engine running range. A fan diameter of the fan 23 of the engine 10 may be selected to be suitable for a desired running speed—fan diameter may therefore be selected such that an appropriate running speed for the fan does not cause a primary resonance mode of the core shaft 26 between the first 26a and second 26b bearings within the engine running range.

The skilled person would appreciate that a mode 1 resonance (a primary resonance) has only two nodes, whereas a mode 2 frequency has an additional, central, node and a smaller maximum amplitude, A.

When an engine 10 is being designed 3000, prior to manufacture, the designer has more scope for adjusting engine parameters. A design method 3000 may comprise selecting 3002 positions for the forward bearing 26a and the forwardmost bearing 26b of the rearward bearings 26b, 26c—for example selecting the location of each based on the spacing therebetween (e.g. from 1450 to 2500 mm), and on locations of other engine components. The method 3000 may further comprise increasing (or decreasing) 3004 the length of the core shaft 26 rearward of the forwardmost bearing 26b of the rearward bearings 26b, 26c so as to provide a suitable shaft length for the minor span (i.e. the distance between the two rearward bearings 26b, 26c) to be in a suitable range (e.g. from 250 mm to 350 mm) such that there is no primary resonance of the core shaft 26 within the running speed range of the core shaft 26. The rearwardmost bearing 26c of the two rearward bearings (the third bearing, in the embodiment being described) may be located at the rearward end of the core shaft 26, or adjacent the end of the core shaft 26.

In various such embodiments, the core shaft 26/engine 10 may have a running speed range at cruise of 5400-5700 rpm, and optionally 5500-5600 rpm.

In various such embodiments, the core shaft 26/engine 10 may have a running speed range at MTO of 5800-6200 rpm, and optionally 5900-6100 rpm.

In various such embodiments, the core shaft 26 may have a length, L, of 1800-2900 mm, optionally 2300-2800 mm, and further optionally 2400-2750 mm.

In various embodiments, the bearing stiffness at the forwardmost 26b of the two rearward bearings 26b, 26c is controlled. Control of the stiffness may allow or facilitate management of vibrational modes.

The forward of the two rear bearings 26b (which may also be referred to as the second bearing) has a bearing stiffness in the range of 30 kN/mm to 100 kN/mm, and optionally around 50 kN/mm, through a spring bar (as described below).

The stiffness of the second bearing 26b is determined, in part, by the engine condition. The lower the excitation at this bearing 26b, the lower the stiffness offered, but higher the excitation, the higher the stiffness and also the higher the damping. Bearing stiffness is a variable parameter depending on the engine condition, and may, for example, vary within the range listed above during normal operation of an aircraft.

The forwardmost rearward bearing 26b comprises an outer ring 51 encircling the core shaft 26; the ring 51 may be referred to as a race, and may contain ball bearings 52 or the likes, as well as oil arranged to lubricate the race in use. An inner ring 53 (or race), radially inward of the outer ring 51, may server to retain the ball bearings 52 within the channel formed between the races 51, 53.

Figure 13:
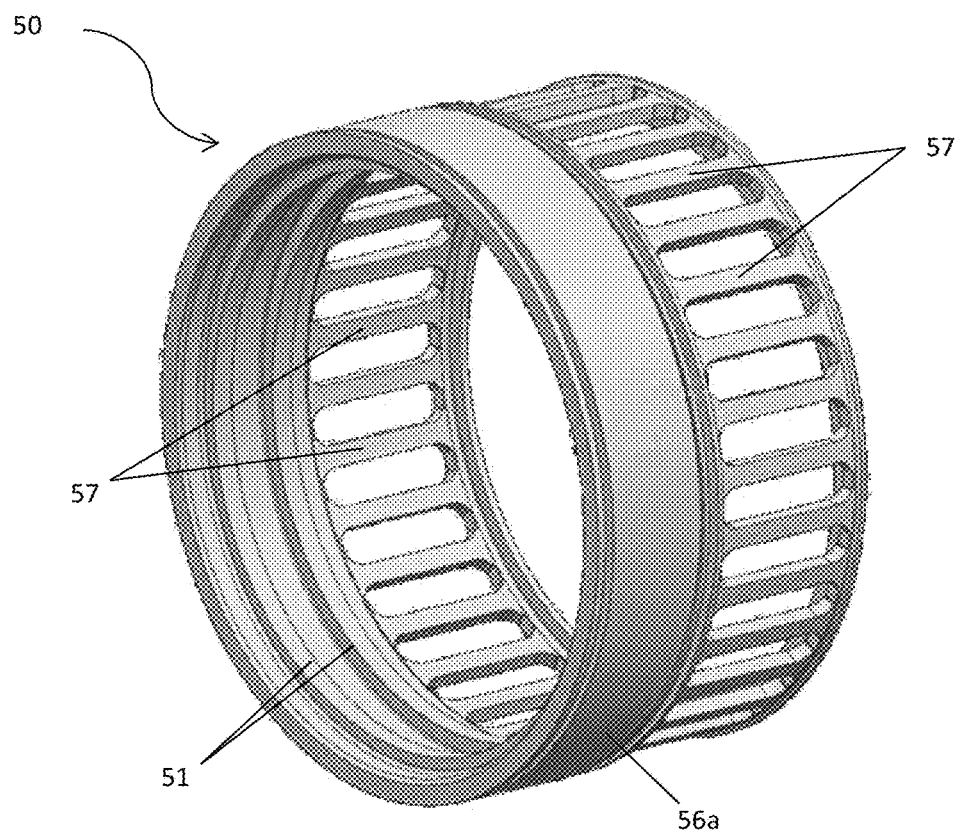
FIG. 13 is a perspective view of a first bearing support structure.

The outer race 51 of this rearward bearing 26b is mounted on the stationary support structure 24 of the engine by means of one or more bearing support structures 50, 55. In the embodiment being described, two bearing support structures 50, 55 are present. The bearing support structures 50, 55 may together form a bearing disc 29a, as shown schematically by comparison of FIGS. 12 and 14. The bearing support structures 50, 55 of the embodiment being described are each connected to the same tail bearing housing 29. In the embodiment being described, the tail bearing housing 29 forms a part of the stationary support structure of the engine 10. The disc 29a (comprising component support structures 50 and 55) extends from the tail bearing housing 29 to the bearing 26b. In the embodiment being described, the first bearing support structure 50 is mounted on the stationary support structure 24 of the engine 10 at a first position 58a. The first position 24a is axially rearward of the bearing 26b in the embodiment being described. The first bearing support structure 50 provides the outer race 51 in the embodiment being described; in particular, the outer race 51 is formed integrally with the first bearing support structure 50 as shown in FIG. 13. In alternative embodiments, the outer race 51 may be formed separately from, and mounted on, the first bearing support structure 50.

In the embodiment being described, the first bearing support structure 50 comprises a plurality of connecting members 57, which are spaced circumferentially around the engine axis 9, connecting the outer race 51 to a stationary support structure 58. The connecting members 57 extend axially along a portion of the engine 10.

For example, there may be twenty or forty, evenly-spaced, connecting members 57 in some embodiments—numbers and/or spacings may vary in other embodiments. The one or more connecting members may extend between the outer race of the bearing 26b, 26c and a bearing housing 29, 31. The bearing housing 29, 31 may be rigidly connected to the stationary support structure 58, so effectively becoming a part of the support structure 58.

The or each connecting member 57 may comprise a metal bar or strut, and may be referred to as a spring bar. The or each connecting member 57 may be arranged to provide some flexibility to the bearing 26b, 26c, so allowing some radial and/or axial movement in use (e.g. due to expansion) to be accommodated. The flexibility of the first bearing support structure 50 may therefore be referred to as a spring bar stiffness.

In the embodiment being described, the second bearing support structure 55 is mounted on the stationary support structure 58 of the engine 10 at a second position 58b. In the embodiment being described, the first 58a and second 58b positions on the stationary support structure 58 are each located on a tail bearing housing 29 portion of the stationary structure 58.

Figure 14:
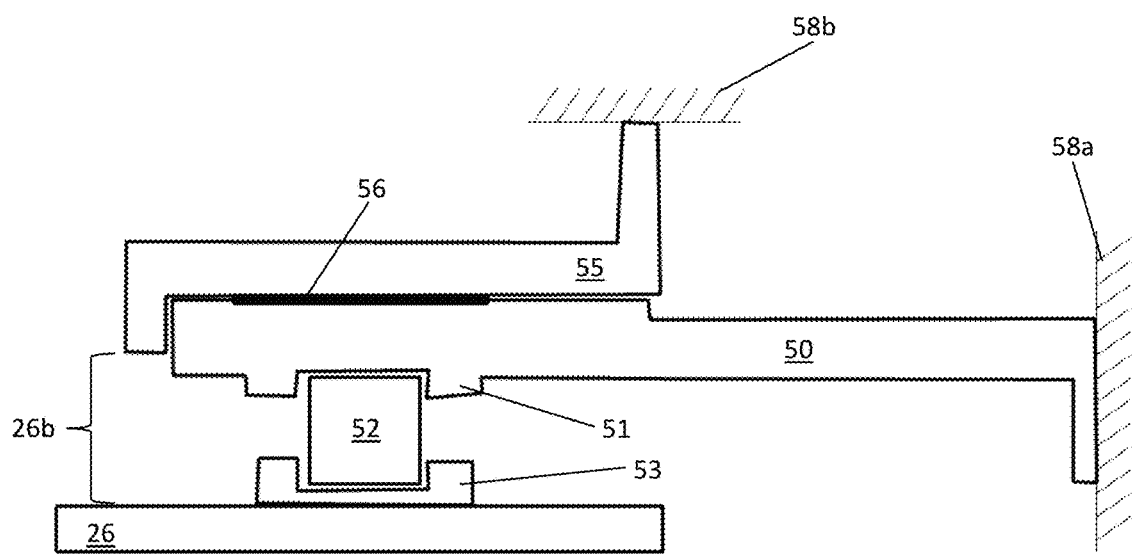
FIG. 14 is a cross-sectional view of the first bearing support structure shown in FIG. 13 in position within a bearing housing.

The second position 58b is axially rearward of the (forwardmost rear) bearing 26b, but axially forward of the first position 58a on the stationary support structure 58, in the embodiment being described, and is radially outward from both the bearing 26b and the first position 58a. In this embodiment, the second bearing support structure 55 is connected between a radially outer surface of the first bearing support structure 50 and the stationary support structure 58, as shown in FIG. 14—in other embodiments, the connection may be different. In the embodiment being described, the second bearing support structure 55 has a relatively high stiffness (as compared to the first bearing support structure 50), and therefore has a negligible contribution to the flexibility of the bearing 26b. It may be thought of as effectively rigid.

A squeeze film damper 56 is provided between the first bearing support structure 50 and the second bearing support structure 55, in the region of the outer race 51. In the embodiment being described, a channel 56a bordered by raised lips is provided around the outer circumference of the first bearing support structure 50 to accommodate the squeeze film damper 56 and to locate O-ring seals (not shown; axially spaced to lie one at each end of the channel 56a). In alternative embodiments, no such channel and lips may be provided, and/or a channel and lips may be provided on the second bearing support structure 55 instead or as well, and the squeeze film damper 56 may be (in some cases, entirely) contained by O-ring seals or the likes. This film is in addition to the hydrodynamic oil layer between the bearing 52 and the core shaft 26 (i.e. the ball bearings 52, or the likes, are often lubricated by a layer of oil—the squeeze film damper 56 is a layer separate from the ball bearings 52).

The squeeze film damper 56 comprises a film layer, usually a layer of oil or another lubricant, between the bearing 26b and the housing 30. The squeeze film damper 56 is arranged to soften the bearing support to increase damping effectiveness. The stiffness of the squeeze film damper 56 generally depends on temperature and on shaft rotation rate. The skilled person would appreciate that any eccentricity in the rotation of the bearing 26b may be damped by the squeeze film damper 56. The squeeze film damper 56 may provide some structural isolation of the supporting structure 58 from the core shaft 26, may reduce the amplitudes of rotor responses to imbalance, and may assist in suppressing rotordynamic instability. This damping may be of particular utility if a blade set has an uneven mass distribution (e.g. due to damage in use, or to a manufacturing defect), or if an unwanted event during manufacturing, maintenance or operation moves a blade set out of radial alignment, such that it is slightly tilted with respect to the engine axis 9.

The inventor appreciated that overall bearing stiffness can be thought of as having three parts, which may be considered as springs, for example arranged in parallel or a combination of series and parallel (depending on component arrangements), namely:

the stiffness of a layer of oil in the bearing (the squeeze film damper fluid stiffness);
the bearing support 50 stiffness (generally most influenced by the connecting member 57 stiffness—this may be referred to as a spring bar stiffness); and
the stiffness of the stationary supporting structure 29, 58 on which the bearing is mounted.

The stationary supporting structure 58 has a much higher stiffness than the other two contributions to bearing stiffness, so is treated as effectively rigid. Any flexibility in the stationary supporting structure 58 may only become apparent in extreme conditions such as blade-off events. The stiffness of the oil layer varies significantly depending on shaft rotation rate and temperature, but, at cruise speeds and above, the oil stiffness is much higher than the spring bar stiffness of the bearing. The stiffness of each bearing is therefore considered in terms of its spring bar stiffness.

The spring bar stiffness of a bearing 26b is defined as a radial stiffness—i.e. a linear deflection, δ, along a radius of the engine 10 is measured, the deflection being caused by a force, F. This is illustrated in FIGS. 15A and 15B. The diagonal hatching illustrates that the stationary structure 58 is deemed to be rigid/unmoving.

FIG. 15A illustrates the bearing support structure 50, 56, 55 (with the core shaft 26, inner race 53 and ball bearings 52 excluded for clarity), with a portion of a radius, r, of the engine 10 marked on with a dotted line. The marked radial line is located at the axial centrepoint of the bearing race 51. A force, F, is shown applied along the radius, r, in a radially outward direction (i.e. away from the axial centreline). FIG. 15B shows the initial position of the first bearing support structure 50 (before application of the force, F) in a broken line, and a final position of the first bearing support structure 50 (during application of the force, F) in a solid line. The skilled person would appreciate that the deflection shown is much larger than would be expected in normal operation, and is provided for ease of understanding only. Further, the first bearing support structure 50 should return to its initial position after removal of the force, F, during normal operation. A displacement, or deflection, δ, is then measured along the radius, r, at the axial centrepoint of the bearing race 51. Two black dots illustrate the position of the inner surface of the first bearing support structure 50 before and during application of the force, F. The displacement, δ, is the distance between those points. The inner surface of the first bearing support structure 50 is chosen for ease of demonstration only—the skilled person would appreciate that another point—such as the radially outer surface, or a radial centre point of the first bearing support structure 50, or the likes—could be chosen instead. The displacement reflects the combination of compression of the squeeze film damper 56, bending of the first bearing support structure 50 (and in particular of the spring bars 57), and any bending of the second bearing support structure 55. The bearing stiffness is therefore a measure of the radial displacement caused by the application of a radial force at the axial centrepoint of the bearing 26b.

In the embodiment being described, a force, F, of 50 kN causes a deflection, δ, of 1 mm when applied to the forwardmost bearing 26b of the two rear bearings 26b, 26c, so the stiffness of that bearing 26b, as defined herein, is 50 kN/mm. Bearing stiffnesses may vary between the two rear bearings 26b, 26c, and between embodiments.

The forwardmost bearing of the rearward bearings 26b therefore has a bearing stiffness in the range of 30 kN/mm to 100 kN/mm in the embodiment being described.

A stiffness ratio at the forwardmost rearward bearing 26b (i.e. the second bearing along the core shaft, in the embodiment being described) may be defined as:

$$\frac{\text{the bearing stiffness at the forwardmost rearward bearing } (26b)}{\text{the minor span } (S)}$$

Figure 10:
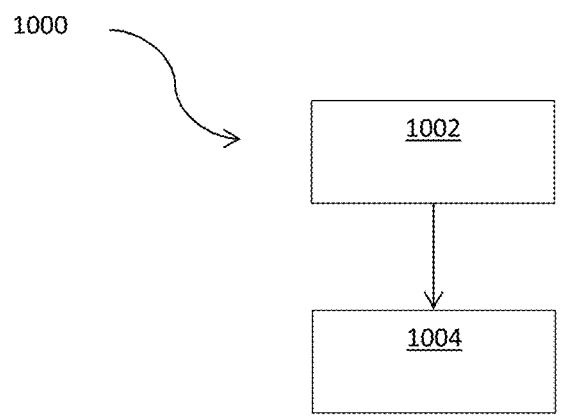
FIG. 10 illustrates a method of operating a gas turbine engine.

In various embodiments, this stiffness ratio may be in the range from 0.08 to 0.5 kN/mm², and optionally in the range from 0.09 to 0.40 kN/mm². Optionally the stiffness ratio may be at least substantially equal to 0.25, 0.30, or 0.35 kN/mm². FIG. 10 illustrates a method 1000 which may be performed, the method 1000 comprising starting 1002 an engine 10 of an aircraft and reaching cruise conditions, and operating 1004 the aircraft under cruise conditions.

The engine 10 may have a running speed range at cruise of 5400-5700 rpm, and optionally of 5500-5600 rpm.

The engine 10 may be operated such that there is no primary resonance mode between the first 26a and second 26b bearings under cruise conditions.

The engine 10 may be operated such that there is no primary resonance mode between the first 26a and second 26b bearings anywhere within the engine running range (including both MTO and cruise).

The lengths defined herein, unless otherwise stated, are for the corresponding component(s) when the engine is off (i.e. at zero speed/on the bench, at room temperature). These values generally do not vary significantly over the operating range of the engine (e.g. having only a few mm expansion in shaft length at running temperature, or less); the value at cruise conditions of the aircraft to which the engine is attached (those cruise conditions being as defined elsewhere herein) may therefore be the same as for when the engine is not in use. However, where the length varies over the operating range of the engine, the values defined herein are to be understood as being lengths for when the engine is at room temperature and unmoving.

By contrast, as the oil layer stiffness is speed-dependent, and contributes to bearing stiffness, the bearing stiffness is defined at cruise conditions/with the shaft rotating at a suitable speed for cruise.

FIG. 17 illustrates how the bearing stiffnesses defined herein may be measured. FIG. 17 shows a plot of the displacement δ resulting from the application of a load L (e.g. a force, moment or torque) to an arbitrary component for which the stiffness is being measured. At levels of load from zero to $L_P$ there is a non-linear region in which displacement is caused by motion of the component (or relative motion of separate parts of the component) as it is loaded, rather than deformation of the component; for example moving within clearance between parts. For a bearing 26b, the amount of displacement possible in this non-linear region is likely to be very small. At levels of load above $L_Q$ the elastic limit of the component has been exceeded and the applied load no longer causes elastic deformation—plastic deformation or failure of the component may occur instead. Between points P and Q the applied load and resulting displacement have a linear relationship. The stiffnesses defined herein may be determined by measuring the gradient of the linear region between points P and Q (with the stiffness being the inverse of that gradient). The gradient may be found for as large a region of the linear region as possible to increase the accuracy of the measurement by providing a larger displacement to measure. For example, the gradient may be found by applying a load equal to or just greater than $L_P$ and equal to or just less than $L_Q$. Values for $L_P$ and $L_Q$ may be estimated prior to testing based on materials characteristics so as to apply suitable loads.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising
   a turbine that is a lowest pressure turbine of the gas turbine engine and has a lowest pressure set of blades, each blade of the lowest pressure set of blades having a mass, m, a radius at blade mid-height, r, and an angular velocity at cruise, ω,
   a compressor that is a lowest pressure compressor of the gas turbine engine, and
   a core shaft connecting the turbine to the compressor, and
   three bearings arranged to support the core shaft, the three bearings comprising a forward bearing and two rearward bearings, with a minor span, S, being defined as an axial distance between the two rearward bearings;
a fan located upstream of the engine core, the fan comprising a plurality of fan blades; and
a gearbox that is configured to receive an input from the core shaft and output drive to the fan so as to drive the fan at a lower rotational speed than the core shaft, and wherein a first blade to bearing ratio of:

$$\frac{\text{the minor span S}}{mr\omega^2 \text{ for a blade of the lowest pressure set}}$$

has a value in a range from $2.0 \times 10^{-6}$ to $7.5 \times 10^{-6}$ $\text{kg}^{-1} \cdot \text{rad}^{-2} \cdot \text{s}^2$.

2. The gas turbine engine of claim 1, wherein the first blade to bearing ratio is in a range from $2.0 \times 10^{-6}$ to $6.5 \times 10^{-6}$ $\text{kg}^{-1} \cdot \text{rad}^{-2} \cdot \text{s}^2$.

3. The gas turbine engine of claim 1, wherein a second blade to bearing ratio of:

$$\frac{\text{the minor span S}}{m \times r \text{ for a blade of the lowest pressure set}}$$

has a value in a range from 0.8 to 6.0 $\text{kg}^{-1}$.

4. The gas turbine engine of claim 1, wherein the minor span, S, is in a range from 250 mm to 350 mm.

5. The gas turbine engine of claim 1, wherein m multiplied by r is in a range from 180 to 280 kg·mm.

6. The gas turbine engine of claim 1, wherein the gearbox has a gear ratio greater than 3.

7. The gas turbine engine of claim 1, wherein the core shaft has a running speed in a range from 1500 rpm to 6200 rpm.

8. The gas turbine engine of claim 1, wherein a length ratio of the minor span between the two rearward bearings to a length of the core shaft is equal to or less than 0.14.

9. The gas turbine engine of claim 1, wherein:
   (i) the mass, m, of the blade of the lowest pressure set of blades is in a range from 0.2 to 0.6 kg; and/or
   (ii) the radius at blade mid-height, r, of the blade of the lowest pressure set of blades is in a range from 400 to 600 mm.

10. The gas turbine engine of claim 1, wherein the angular velocity at cruise, ω, of each blade of the lowest pressure set of blades is in a range from 560 to 600 $\text{rad} \cdot \text{s}^{-1}$.

11. The gas turbine engine of claim 1, wherein:
   (i) the core shaft has a length, L, between the forward bearing and a rearmost rearward bearing of the two rearward bearings and the minor span, S, is in a range from 250 mm to 350 mm; and/or
   (ii) the fan has a fan diameter in a range from 330 cm to 380 cm.

12. The gas turbine engine of claim 1, wherein at least one of (i) and (ii) is satisfied:
   (i) the core shaft has a length, L, between the forward bearing and a rearmost rearward bearing of the two rearward bearings in a range of 1800-2900 mm; and
   (ii) the turbine has a turbine length defined between a leading edge of its most upstream blades and a trailing edge of its most downstream blades, wherein a minor span to turbine length ratio of:

$$\frac{\text{the minor span S}}{\text{the turbine length L}}$$

is equal to or less than 1.05.

13. The gas turbine engine of claim 1, wherein the two rearward bearings are positioned axially level with or rearward of:
   (i) a leading edge of a lowest pressure turbine blade of the turbine at a root of the blade; and/or
   (ii) a trailing edge of a turbine blade of a third set of turbine blades from a front of the turbine, at a root of the blade, wherein the turbine comprises four sets of turbine blades.

14. The gas turbine engine of claim 1, wherein:
   (i) a forwardmost rearward bearing of the two rearward bearings has a bearing stiffness in a range of 30 kN/mm to 100 kN/mm; and/or (ii) a stiffness ratio of the bearing stiffness at the forward-most rearward bearing to a distance between the two rearward bearings is in a range from 0.08 to 0.5 kN/mm².

15. The gas turbine engine of claim 1, further comprising a tail bearing housing located rearward of the turbine and comprising two bearing discs, each bearing disc arranged to support one of the two rearward bearings, and wherein optionally the two bearing discs are oriented substantially perpendicular to an axis of the gas turbine engine.

16. The gas turbine engine of claim 1, wherein:

the turbine is a first turbine, the compressor is a first compressor, and the core shaft is a first core shaft;

the engine core further comprises a second turbine, a second compressor, and a second core shaft connecting the second turbine to the second compressor; and the second turbine, second compressor, and second core shaft are arranged to rotate at a higher rotational speed than the first core shaft.

17. A gas turbine engine for an aircraft comprising:

an engine core comprising:

a turbine that is a lowest pressure turbine of the gas turbine engine and has a lowest pressure set of blades, each blade of the lowest pressure set of blades having a mass, m, and a radius at blade mid-height, r, a compressor that is a lowest pressure compressor of the gas turbine engine, a core shaft connecting the turbine to the compressor, and three bearings arranged to support the core shaft, the three bearings comprising a forward bearing and two rearward bearings, with a minor span, S, being defined as an axial distance between the two rearward bearings;

a fan located upstream of the engine core, the fan comprising a plurality of fan blades; and a gearbox that is configured to receive an input from the core shaft and output drive to the fan so as to drive the fan at a lower rotational speed than the core shaft, wherein a second blade to bearing ratio of:

$$\frac{\text{minor span}}{m \times r \text{ for a blade of the lowest pressure set}}$$

has a value in a range from 0.8 to 6.0 kg⁻¹.

18. The gas turbine engine of claim 17, wherein the second blade to bearing ratio is in a range from 0.8 to 5.0 kg⁻¹.

19. A method of operation of a gas turbine engine for an aircraft comprising:

an engine core comprising:

a turbine that is a lowest pressure turbine of the gas turbine engine and has a lowest pressure set of blades, each blade of the lowest pressure set of blades having a mass, m, a radius at blade mid-height, r, and an angular velocity at cruise, ω, a compressor that is a lowest pressure compressor of the gas turbine engine, a core shaft connecting the turbine to the compressor, and three bearings arranged to support the core shaft, the three bearings comprising a forward bearing and two rearward bearings, with a minor span, S, being defined as an axial distance between the two rearward bearings;

a fan located upstream of the engine core, the fan comprising a plurality of fan blades; and a gearbox arranged to receive an input from the core shaft and to output drive to the fan so as to drive the fan at a lower rotational speed than the core shaft, the method comprising:

operating the gas turbine engine such that a first blade to bearing ratio of:

$$\frac{\text{the minor span S}}{mr\omega^2 \text{ for a blade of the lowest pressure set}}$$

has a value in a range from $2.0 \times 10^{-6}$ to $7.5 \times 10^{-6}$ kg⁻¹·rad⁻²·s² at cruise.

20. The method according to claim 19, further comprising operating the core shaft at a running speed in the range from 1500 rpm to 6200 rpm.

* * * * *